United States Patent [19]
Saks et al.

[11] Patent Number: 5,666,532
[45] Date of Patent: Sep. 9, 1997

[54] COMPUTER METHOD AND APPARATUS FOR ASYNCHRONOUS ORDERED OPERATIONS

[75] Inventors: Jonathan Haim Saks, Summit; Kshitij Arun Doshi, Springfield, both of N.J.

[73] Assignee: Novell, Inc., Orem, Utah

[21] Appl. No.: 648,304

[22] Filed: May 2, 1996

Related U.S. Application Data

[63] Continuation of Ser. No. 280,307, Jul. 26, 1994, abandoned.
[51] Int. Cl.$^6$ .................................................. G06F 12/00
[52] U.S. Cl. ............................ 395/621; 395/859; 395/878
[58] Field of Search .................................. 395/616, 618, 395/621, 876, 878, 881, 856, 859

[56] References Cited

U.S. PATENT DOCUMENTS 5,218,695  6/1993  Noveck .................................. 395/621

*Primary Examiner*—Thomas G. Black
*Assistant Examiner*—Hosain T. Alam
*Attorney, Agent, or Firm*—Computer Law++

[57] ABSTRACT

A computer system having data organized in files, having a secondary storage for storing files, having a primary storage, and having one or more types of file subsystems (file system implementations) for controlling transfer of files between primary storage and secondary storage. A subset of writes to secondary storage are performed using a Delayed Ordered Write (DOW) subsystem, which makes it possible for any file system to control the order in which modifications are propagated to disk. The DOW subsystem consists of two parts. The first part is a specification interface, which a file system implementation or any other kernel subsystem can use to indicate sequential ordering between a modification and some other modification of file system structural data. The second part of DOW subsystem is a mechanism that ensures that the disk write operations are indeed performed in accordance with the order store. DOW improves computer system performance by reducing disk traffic as well as the number of context switches that would be generated if synchronous writes were used for ordering.

52 Claims, 14 Drawing Sheets

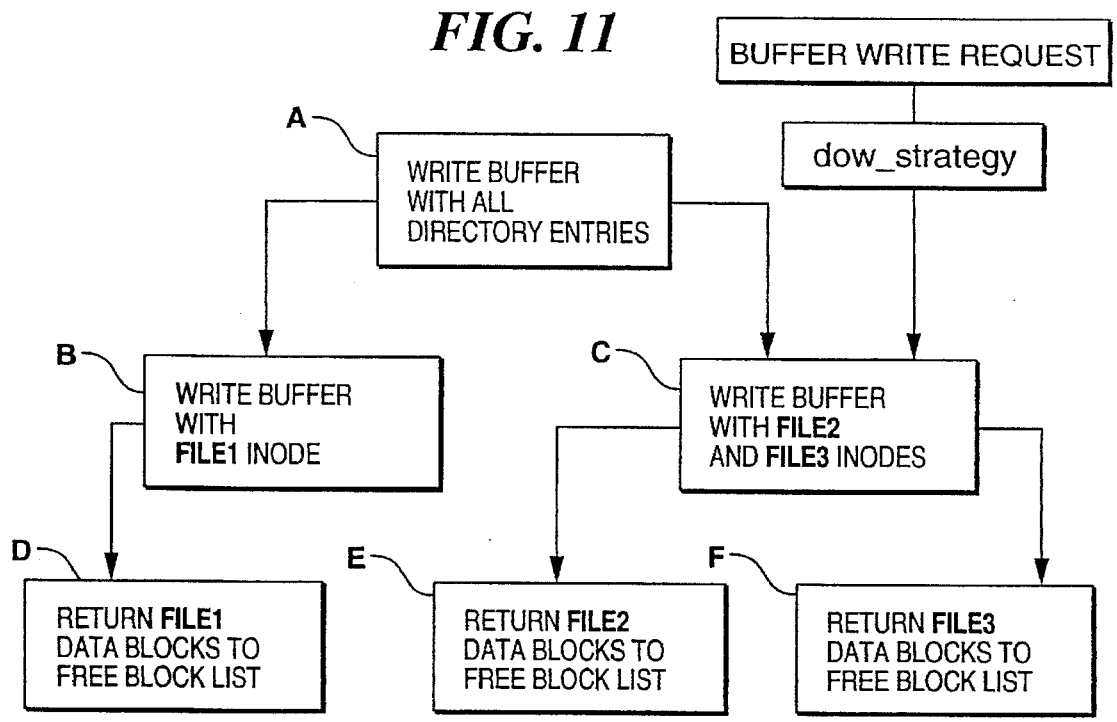
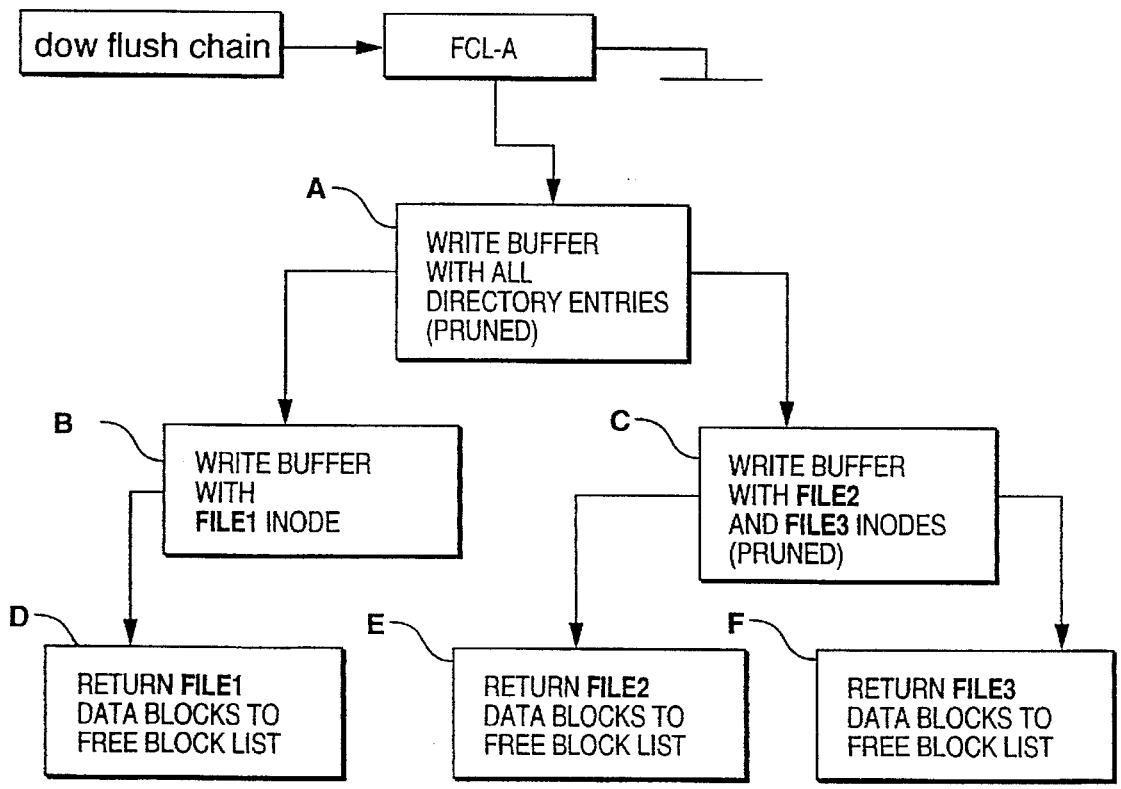

FIG. 17
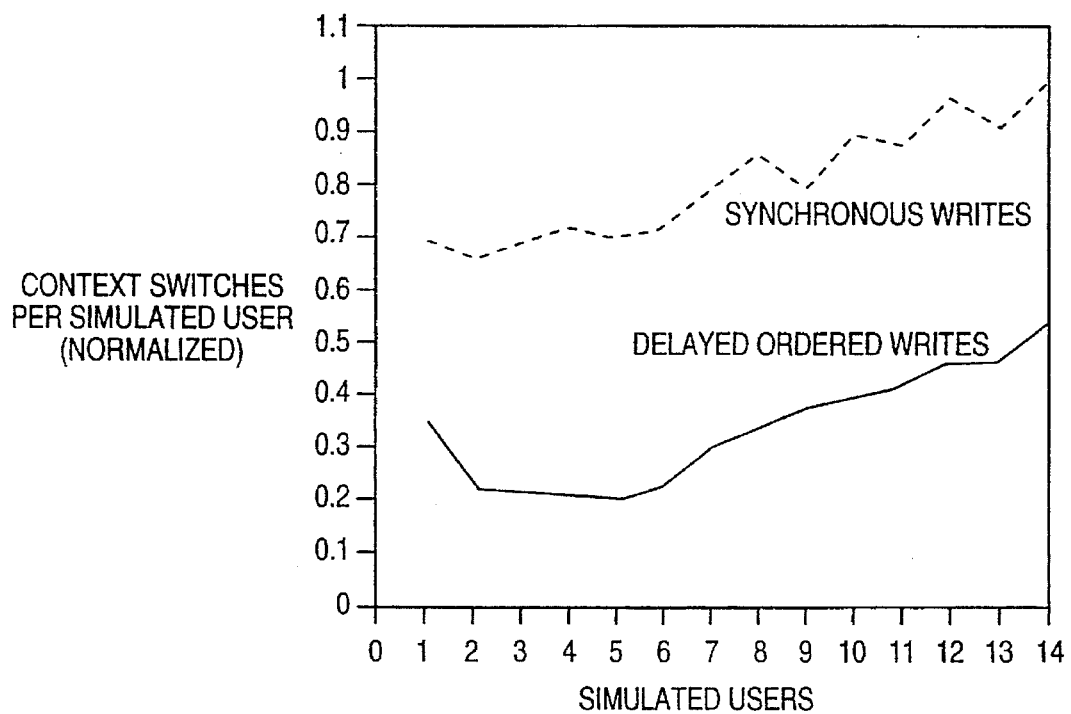
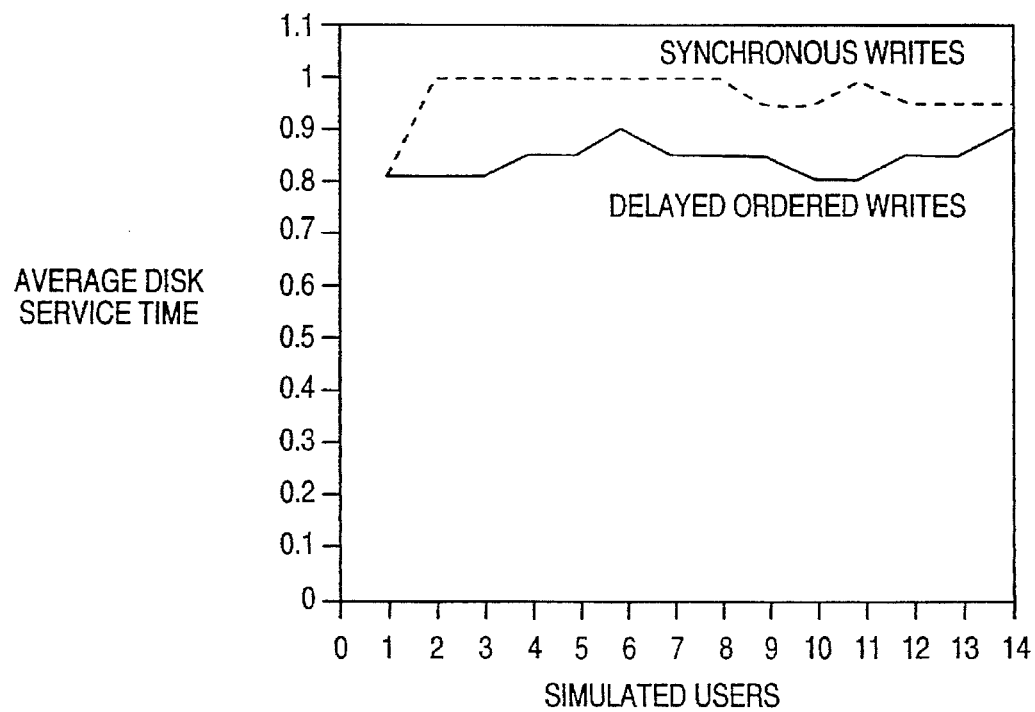
FIG. 18

COMPUTER METHOD AND APPARATUS FOR ASYNCHRONOUS ORDERED OPERATIONS

This application is a continuation of application Ser. No. 08/280,370 filed Jul. 26, 1994 and now abandoned.

BACKGROUND OF THE INVENTION

The present invention relates to computer systems and to file system implementations for computer operating systems and methods and apparatus used by file systems for controlling the order of operations, such as the order in which information is updated on secondary storage, to realize gains in performance.

Computer systems are composed of hardware and software. The hardware includes one or more processors, typically a central processing unit (CPU), main storage or memory, secondary storage, and other input/output (I/O) devices. The software includes an operating system and user (application) programs. The computer system executes user programs in the hardware under the control of the operating system. The operating system controls the operation of secondary storage devices and other I/O devices such as terminals through a set of software modules called device drivers.

In modern computer systems, secondary storage systems such as disks have become performance bottlenecks because processors have higher speeds than disks. Various methods have been used to minimize the impact of disk subsystems on overall system performance. For example, some disk controllers employ large random access memories as disk caches in order to reduce the number of slower disk accesses. Operating system device drivers use a variety of algorithms to schedule disk requests so that they can be serviced with minimum mechanical movement or delays within the disk hardware. Some file system implementations log their operations so that it is not critical to have all intermediate information updates applied immediately to secondary storage. See, for example, Mendel Rosenblum and John K. Ousterhout, "The Design and Implementation of a Log Structured File System," *Proceedings of the 13th ACM Symposium on Operating System Principles* (October 1991), and Robert Hagmann, "Reimplementing the Cedar File System using Logging and Group Commit," *Proceedings of the 11th ACM Symposium on Operating Systems Principles* (November 1987).

By way of background, three types of writes exist for writing information to disk storage, namely, Synchronous, Asynchronous, and Delayed writes. With a synchronous write, the computer system suspends execution of the program that caused the write to occur. When the write completes, the program is allowed to continue. With an asynchronous write, the computer system permits the program to continue, after enqueuing the request for writing with the device drivers that manage the operation of disks. In this case, the program can make further progress, even though the actual information to be written is not yet stored to disk. Delayed writing is a special type of asynchronous write, in which the execution of the program is allowed to continue without enqueuing the write request with the device drivers. In this case, the buffer in memory that is modified during the write is marked as needing to be written to disk, and the request is propagated to the device driven by the operating system at a later time. Generally, the operating system ensures that the request propagates within a finite time interval. Asynchronous writes achieve a performance advantage over synchronous writes by decoupling the execution of processors from disk subsystems and allowing more overlap between them. Delayed writes improve the decoupling and serve to reduce the aggregate number of disk writes by allowing multiple modifications of the same buffer to be propagated to the disk with a single disk write.

Despite the performance advantage of using asynchronous and delayed writes over synchronous writes as described above, many file system implementations employ synchronous write operations for recording changes to file system structural (administrative) data. Synchronous writing is used so that the file system implementation can regulate the order in which structural changes appear on the disk. By controlling the order in which modifications of structural data are written to disk, a file system implementation achieves the capability to perform file system repairs in the event that a system crash occurs before a sequence of structural changes can complete and reach a self-consistent organization of file system structural information. The specific requirements for ordering updates of structural data vary according to file system implementation as described, for example, in M. Bach, "The Design of the UNIX Operating System," Prentice-Hall, Englewood Cliffs, 1986. An example of a utility for repairing file systems following a crash, the fsck program, is described in M. MeKusick, W. Joy, S. Leffler, and S. Fabry, "Fsck—The UNIX File System Check Program," UNIX System Manager's Manual—4.3 BSD Virtual Vax-11 Version, USENIX, April 1986.

As described above, many file system implementations need to perform ordered disk writing for maintaining structural order and repairability and therefore they employ synchronous writes that maintain the order of disk writes. The use of synchronous writes, however, limits system performance since disks and other secondary storage devices are slower relative to processors and main memory. File system formats can be designed to minimize the number of distinct disk updates needed for accomplishing a consistent reorganization of structure. Alternative techniques for repairability, such as intent logging, provide the ability to recover from an incomplete sequence of disk modifications. Such alternatives, while being beneficial to performance, have proved overly burdensome due to loss of media or software compatibility. Accordingly, there is a need for an improved operating system that provides control of write ordering without the performance penalty of synchronous writing and without mandating special hardware, new media formats or other changes.

SUMMARY OF THE INVENTION

The present invention applies to a computer system having data organized in files, having a secondary storage for storing files, having a primary storage, and having one or more types of file subsystems (file system implementations) for controlling transfer of files between primary storage and secondary storage. A subset of writes to secondary storage are performed using a Delayed Ordered Write (DOW) subsystem, which makes it possible for any file system to control the order in which modifications are propagated to disk. The DOW subsystem consists of two parts. The first part is a specification interface, which a file system implementation or any other kernel subsystem can use to indicate sequential ordering between a modification and some other modification of file system structural data. The use of the specification interface by any file system implementation results implicitly in the construction of an order store in primary storage, that records the ordering interdependence among different buffers affected by the modifications. The second part of DOW subsystem is a mechanism that ensures that the disk write operations are indeed performed in accordance with the order store. The DOW subsystem accomplishes this task by both intercepting and initiating disk write operations, as needed, to control the actual sequence of writes presented to device drivers.

DOW improves computer system performance by reducing disk traffic as well as the number of context switches that would be generated if synchronous writes were used for ordering. The use of DOW for controlling the order of structural updates does not require a structural redesign of a file system format, or changes to the system hardware or device drivers. Replacing synchronous writing by DOW-maintained ordered writing provides large gains in system performance.

DOW is modular and is loosely coupled with other kernel subsystems, including the file system implementations that use it. It does not require any modifications to other kernel subsystems or to the standard file system interfaces. Any file system type (implementation) in the operating system can use DOW easily, without structural redesign and without loss of media compatibility. The file system implementation that uses DOW only needs to specify the necessary ordering, if any, among a sequence of structural changes in lieu of forcing synchronous writes. While DOW thus provides an alternate mechanism for regulating the disk writing, the file system implementation retains control of the policy—that is, control of which modifications should be ordered relative to each other.

Thus, DOW allows a computer system to obtain the performance advantage associated with delayed writes while retaining the file system repairability characteristics that come with ordered writing.

The foregoing and other objects, features and advantages of the invention will be apparent from the following detailed description in conjunction with the drawings.

BRIEF DESCRIPTION OF THE DRAWINGS

FIG. 11 depicts a block diagram of the processing in which a write request is reserved for an inode buffer represented by a DOW node.

FIG. 12 depicts a block diagram of the processing in which nodes C and E are marked pruned and the A node is moved to the dow flush chain.

FIG. 17 depicts context switches per user for synchronous writes and delayed ordered writes.

FIG. 18 depicts average disk service time for synchronous writes and delayed ordered writes.

DETAILED DESCRIPTION

Figure 1:
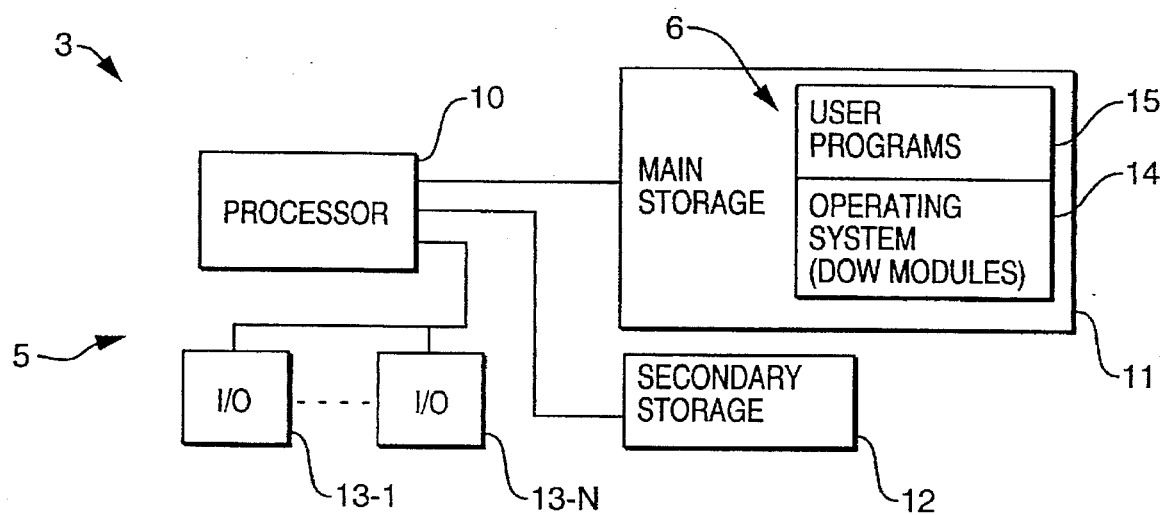
FIG. 1 depicts a block diagram of a computer system employing ordered operations including, for example, delayed ordered writes to secondary storage.

Computer System General—FIG. 1

The computer system 3 of FIG. 1 is composed of hardware 5 and software 6. The hardware 5 includes one or more processors 10, typically a central processing unit (CPU), main storage 11, input/output (I/O) in the form of secondary storage 12 and other input/output devices 13-1, . . . , 13-N. The software 6 includes an operating system 14 and user (application) programs 15. The computer system 3 executes user programs 15 in the hardware 5 under control of the operating system 14. A common instance of the operating system 14 is the UNIX® operating system.

Figure 2:
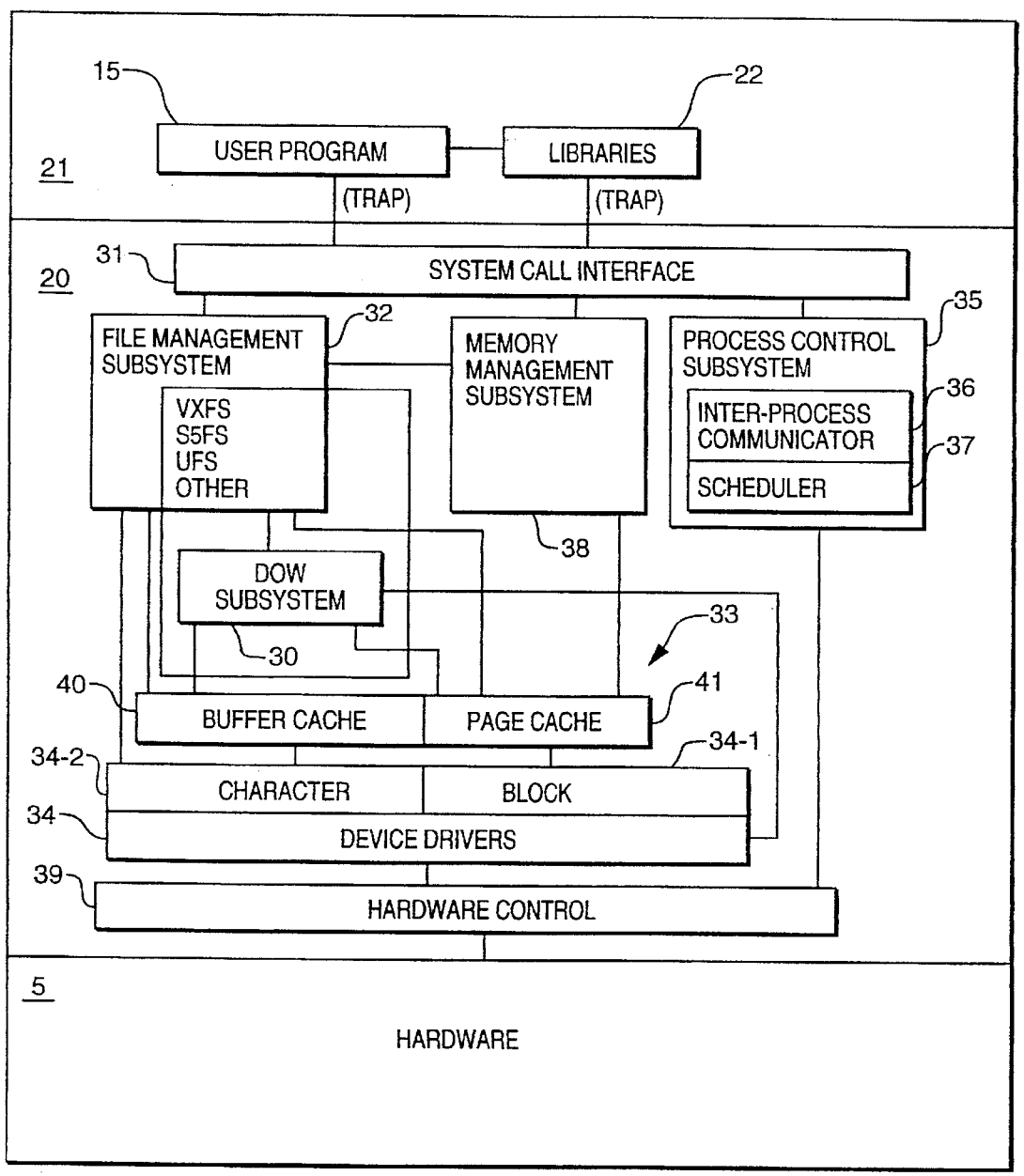
FIG. 2 depicts a block diagram of the operating system software of the computer system of FIG. 1.

UNIX Operating System—FIG. 2

Referring to FIG. 2, the UNIX operating system has files and processes that execute under the control of a kernel 20. A process is a computer program in a state of execution. The computer system of FIG. 1, when running the UNIX operating system, has three levels of operation: user 21, kernel 20, and hardware 5. Typically, application programs run at user level, and request the services of the operating system by means of system calls. A system call interface 31 and libraries 22 exist for this purpose; the libraries 22 are linked in with the user programs 15 and map system calls to primitives that the kernel 20 recognizes.

The kernel 20 acts as a resource manager for all of the resources of hardware 5 of the computer system 3 of FIG. 1. Primarily the kernel has two functions. The first is to provide a large degree of device independence to the application programs by masking details of the various hardware resources needed during computation. The second is to perform various supervisory and control functions so that the needed resources are scheduled as necessary. The kernel is partitioned into a process control subsystem 35, a file management subsystem 32, a memory management subsystem 38, and other supporting subsystems.

The process control subsystem 35 creates or terminates processes in response to explicit or implicit user requests, controls process behavior, obtains the resources that are necessary from the other subsystems for process execution, and provides means for inter-process communication. Chief among the resources that a process needs during execution are usage of the processors 10, usage of primary storage (main storage 11), access to data stored on secondary storage 12, and other facilities such as printers.

The memory management subsystem 38 regulates the use of primary storage for efficient, protected, and convenient access to programs and data, and coordinates with file management subsystem 32 so that file data is transferred between primary and secondary storage as needed by processes. In most UNIX operating system versions, the memory management subsystem provides the convenient illusion of a linear space in which processes can expect to reference the data or code that they need during execution, although the main storage 11 employed for meeting this need is neither linearly nor continuously present for a specific process. This illusion is supported by managing the main storage in small units of allocation, called pages, and by dynamically adjusting the mapping between process generated references (also called addresses) and the pages into which the data accessed by these references reside. The pool of pages that are so used, as the variably allocatable storage resource, is termed a page cache that appears in FIG. 2 as page cache 41.

Over the duration that the operating system executes a specific process on a processor, the processor is said to be functioning in the context of the process. The context of a process refers to the overall hardware and software state of a processor that makes it possible for the memory references generated during the process execution to map correctly to the physical addresses that contain the instructions or data needed for computation. Accordingly, the context of a process is defined by all the machine register contents that need to be saved at the time that the process control subsystem 35 disembarks the process from execution on a processor. This "saved context" information must be subsequently restored on a processor, in order to continue the execution of that process on the processor. The operation of a processor of stopping the execution of one process, saving its context, and restoring the context of a second process, so that the second process uses the processor instead of the first process, is called a context-switch.

The file management subsystem 32 commonly comprises one or more file systems, each of which spans a single logical partition or subdivision of a secondary storage medium such as a disk, and which organize the data within that partition. Generally, multiple implementations of file systems are available, each providing a common set of services to the remainder of the operating system and differentiated from other implementations by virtue of specialized functions and structure that are appropriate for the specific uses intended by the implementation. The common set of services offered by various file system implementations to the other kernel subsystems is generally called the Virtual File System interface.

A file system implementation is also commonly referred to as a file system type. Some of the commercial file system types that are in wide use are the UFS, S5FS, and VxFS file system implementations. These names are acronyms for (1) the [Berkeley] Unix File System, see M. McKusick et. al., "A Fast File System for UNIX," *ACM Transactions on Computer Systems* pp. 181–197, 1984, (2) the (AT&T) System V File System, see Maurice J. Bach, *"The Design of the UNIX Operating System"*, Prentice-Hall, Englewood Cliffs, 1986, and (3) the Veritas eXtent File System, (see the *Veritas(TM) File System Administrator's Guide*, VERITAS Software Corporation, 4800 Great America Parkway, Suite 420, Santa Clara, Calif. 95054). Also, a file system type that is used commonly for providing file system services between machines connected by a network is the NFS, or the Network File System, see R. Sandberg, et. al., "Design and Implementation of the Sun Network File System," *Proceedings of the USENIX 1985 Summer Conference*, pp. 119–130, June 1985. Since file system types can be different, the specific file system type to which any particular discussion in this specification applies will be identified where such identification is important.

The transfer of data between primary storage and peripheral (I/O) devices such as disks, terminals, or printers, and the control of such devices, is accomplished by the services of kernel modules called Device Drivers 34. The device drivers support two models of access to the peripheral devices. One of the two models is the block device model 34-1, and is used for devices that can be addressed as sequences of blocks, in which the length of a block is typically 512 bytes. The other is called the character device model 34-2 and it is used for devices for which the block device model does not apply.

The block device model is usually applied to disks and tapes. The purpose of the block model is to allow the use of buffering in order to reduce I/O traffic. The sizes of buffers used in performing transfers from or to block devices am some convenient multiples of 512, which is the size of a typical disk block. The buffering for block I/O data transfers is performed either by using some or all pages from the page cache 41, or by a dedicated pool of memory called buffer cache 40, and frequently by employing both the page cache and a buffer cache. In cases where both caches are used, pages that contain file data are used directly as the I/O buffers, while file system structural data (to be described) are held in the buffer cache. Both the file management subsystem 32 and the memory management subsystem 38 cooperatively manage the page cache 41, while only the file management subsystem manages the use of buffers from the buffer cache 40. Collectively, the buffer cache 40 and the page cache 41 are the cache 33.

The functions implemented by block or character device drivers that kernel subsystems can call in order to perform data transfer or control operations are called device driver strategy routines. Of these, the functions called in order to write data from primary storage to secondary storage are called write strategy routines, while those that are called in order to read data from secondary storage into primary storage are called read strategy routines.

Hardware control 39 is responsible for handling interrupts and for communicating with the machine hardware 5. I/O devices 12 and 13, such as disks or terminals, may interrupt the processors (CPU) 10 while a process in executing. If interrupted, the kernel 20 may resume execution of the interrupted process after servicing the interrupt. Interrupts are generally serviced by special functions in the kernel that are called in the context of a currently running process.

While many of the processes that run under the control of the operating system kernel arise from computational work generated by users, some special processes are created and run on behalf of the operating system itself. These special processes are called daemons. Daemons perform many general system-wide services, such as administration and control of networks, line printer spooling, handling of many exceptional situations, and so on.

UNIX File System Data Structures and Organization

A File System is a span or subdivision of a secondary storage medium that is managed by a file system implementation. There exist multiple possible file system types or implementations that manage file systems. Within a file system are files, most of which contain ordinary data. Diskless work-stations are also used, frequently, where files are located on a remote system and are accessed via a network. For simplicity, all devices can be considered as "disks", since the principles apply to any storage device. The files are identified by names, each name is a string of characters. Certain files are distinguished as directories, and they contain names of other files along with pointers to their location in the file system. These names are called directory entries, and may refer either to plain files or to directories. Each file name is also called a "link". The system permits a single physical file within a file system to have more than one name or link.

While conceptually a directory may be considered as containing the files for the file names the directory contains, the files named by a directory actually exist separately and are only referenced by the directory. By allowing directories to contain entries to other directories as well as plain files, the UNIX operating system provides to its users a perspective in which an entire file system is a tree structured hierarchical organization with a single starting directory called the root directory of the file system. The root directory refers to a number of files and directories; the directories in the root directory themselves refer to additional files and directories, and so on, thus covering all available files and directories in the file system.

UNIX file system implementations do not impose any structural requirements on contents of plain files; these files are treated by the file system implementations as streams of bytes, to be arbitrarily accessed by application programs. Application programs may impose specific semantics on file contents in accordance with application needs. For example, some applications may interpret line feed or tab characters as distinguishing ends of data fields within a file; however, this information is of no significance to the file system implementations. The content of directories is however a different matter. Directories contain information about file system organization; so they have a specific structure that is defined by and meaningful to the file system implementation. In addition to directories, a file system implementation reads other structural data from secondary storage, manipulates and writes the structural data back to secondary storage as necessary in order to manage the physical layouts of files and directories and to reflect changes in characteristics of files and directories. Examples of structural data include owners, sizes, and access times for files and directories. The management of structural data occurs without the explicit knowledge or request of application programs and the rules for such management vary from one file system implementation to another.

The kernel deals on a logical level with file systems, viewing them as sequences of logical blocks instead of viewing them as disks or other storage units. In this perspective, each disk or other storage device is viewed as one or more logical devices, identifiable by one or more logical device numbers. A logical device is equivalently a disk partition or a subdivision in which a file system resides. A file system is viewed by the file system implementation as a sequence of logical blocks of storage. The conversion between a logical device address (that is, a file system address) and a physical device address (e.g., a disk block address) is done by one of the block device drivers.

Data Structures and Policies Of File System Implementations

It is not generally possible to describe file system data structures and organization commonly across all file system implementations. The general requirements of all file system implementations are common, however; and these are that it should be possible to allocate and free space for file data and to allocate and free space for any auxiliary data describing the layout and characteristics of files and directories in the file system. Therefore, for simplicity, an overview of data structures and file system space management procedures is given here for the UFS file system implementation, but the principles and the invention to be detailed apply equally to UFS and to other file system implementations. However, to prevent ambiguity, the term UFS will be used to qualify the description that applies particularly to the UFS file system implementation.

In the UFS file system the internal representation of a file is given by an inode which contains a description of the device layout of the file data and other information such as file owner, access permissions, and access times. Every file (or directory) has one inode, but may have several names (also called links), all of which map into the same inode. When a process creates or opens a file by name, UFS parses each component of the file name, checking that the process has the necessary privileges for searching the intermediate directories and then retrieves the inode for the file. In the case of opening or creating a new file, UFS assigns to the file an unused inode. Inodes are stored in the file system and UFS reads the needed inodes into an inode table that is maintained in primary storage for ease and efficiency of access.

A file system in UFS is a sequence of logical blocks. The size of a logical block is a convenient multiple of the smallest size in which data transfer can be performed to secondary storage.

Each UFS file system includes a number of special blocks, which contain file system administrative data, and whose contents are manipulated without explicit request from or knowledge of application programs. One of them is a superblock, which describes the state of the file system and information identifying available inodes and free space (unallocated blocks) in the file system. For achieving compact layouts, UFS divides a file system into smaller divisions called cylinder groups, and uses algorithms that promote allocations of inodes and data blocks from the same or neighboring cylinder groups among correlated uses. To protect against catastrophic loss of information, the superblock is replicated among the cylinder groups. Other blocks containing administrative information include blocks that contain bitmaps describing the available blocks within each of the cylinder groups, and blocks from which space can be used for allocating inodes.

The blocks that contain file data are reachable from the inode for the file by one of three means. The inode itself contains the logical addresses for several initial data blocks. In addition, the inode contains a few block addresses for "indirect" and "double indirect" blocks for large files. The indirect blocks contain addresses of additional data blocks for a file and double indirect blocks contain addresses of additional indirect blocks that could not be accommodated in the inode.

The kernel allows processes to store new information in files or to recall previously stored information. When a process is to access data from a file, the data is brought into main storage 11 where the process can examine it, alter it, and request that the data be saved in the file system again. A process may also create new files and directories, remove existing files and directories, or replicate or rename existing files and directories. In all cases, as file sizes and file and directory populations in a file system change, the auxiliary data that describes the file system organization is brought into memory, examined and altered, and written to secondary storage. For example, the superblock of a file system must be examined when there is a need to allocate a new file or inode or to allocate new data blocks, and the superblock must be modified when data blocks or inodes are allocated or freed. Similarly, an inode describes the layout or data block organization within a file; the operating system reads an inode into memory to access its data, and writes the inode back to secondary storage when updating the file layout. The manipulation of this auxiliary data is done without the explicit knowledge or request of a running process.

If the kernel were to read and write directly to and from disk for all file system accesses, then system response time and productivity would be poor because of the slow rate of data transfers between disk and memory. The file system implementation therefore attempts to minimize the frequency of disk accesses by keeping file data and file system structural information in the page cache 41, or the buffer cache 40, or both the caches. Page cache 41 is generally used for keeping data or code that should be directly addressable from a process running in user mode. Buffer cache 40, on the other hand, is a pool of memory that is allocated to and managed by the file subsystem for storing information that is needed by a file system implementation. Commonly, file data are cached in the page cache 41, while structural data such as inodes, superblocks, and indirect blocks are kept in the buffer cache 40; however, a file system implementation may choose to maintain file data in buffer cache, or to maintain structural data in the page cache for reasons of policy or algorithmic convenience.

Read/Write Procedures

When reading data from disk of secondary storage 12, the kernel first attempts to find the data in buffer/page cache 33 and does not have to read from disk if found in cache 33. If the requested data block is not in the cache 33, then the kernel 20 calls the disk device driver 34 to "schedule" a read request, and suspends the current process ("puts it to sleep") awaiting the completion of the requested I/O. The disk driver notifies the disk controller hardware to read the data, which the disk controller later transfers to the indicated location in the buffer/page cache 33. Finally, the disk controller interrupts the processor when the I/O is complete, and the disk interrupt handler awakens the suspended process; the requested data is then in the cache 33.

Similarly, data being written to disk is cached in cache 33 in case there is a subsequent read attempt for the data. When writing, the kernel also attempts to reduce frequency of disk writes by determining whether the data being written needs to be immediately sent to disk or whether it is transient data that will soon be overwritten and therefore is retained only in cache 33.

The three styles of disk write operations described earlier: synchronous, asynchronous, and delayed writes have differing performance consequences. If the write is synchronous, the kernel informs the disk device driver 34, which schedules a write I/O. The calling process is suspended until the write is done, as in the case of a read request. If the write is asynchronous, a write I/O is scheduled, but the process is allowed to continue without waiting for the write to be done. If the write is delayed, then the page or the buffer of cache 33 to be written is merely marked as needing to be written at a later time and no attempt is made to schedule a write I/O operation. Some time later, the kernel writes the delayed write pages or buffers in cache 33 asynchronously to disk (secondary storage 12). In the interim, if the same buffer or page receives more delayed writes, then all of these writes are accumulated and result in only one physical disk write.

Ordering for Structural Modifications

Many file system implementations need to control the order in which modifications that are made to structural data are recorded to disk. This control is to allow file system repair by programs such as fsck following a system crash. The specific requirements for ordering vary accordingly from one file system implementation to another, but the following example for the UFS file system shows why ordering of modifications is necessary. Consider what happens when a file name is removed from a directory, and the name being removed is the last remaining link to the file. The operation of name removal in this case will also remove the file itself, and free up the storage associated with the file. This operation updates three kinds of structural information: (1) the directory entry, which is space in the directory data block, in which the file name and the file inode are identified, (2) the file inode, which is the structure describing the file layout and file properties such as owner and protections, and (3) the free block list for the file system, to which the file data blocks need to be returned upon the removal of the file. Copies of these structural data are updated in memory: the directory entry is maintained in the page cache while the file inode and the file system superblock which contains the free block list are maintained in the buffer cache. As a simplification, the term "buffer" will be used to refer to any in-memory copy of data, whether that copy is stored in the buffer cache 40 or the page cache 41.

To remove a file, the UFS file system performs the steps in the following TABLE 1.

TABLE 1

1. Clear the directory entry referencing the file name.
2. Write the buffer containing the directory entry to disk.
3. Decrement the link count for the file inode. Since the link count reduces to 0, the file will need to be removed. Zero out all the data block pointers that are described by the file inode, in effect breaking the connection between the file inode and the file data blocks.
4. Write the buffer that contains the file inode, to disk.
5. Return the data blocks that belonged to the file, to the free block list.
6. Mark the inode as "free".
7. Since the file inode was changed again in step (6), mark the buffer that contains it as modified (to be written to disk at a later time).
8. Return the file inode itself to a list of free inodes in the file system.

In the sequence of steps listed in TABLE 1, the cleared directory entry must be written (step 2) to disk, before the freed inode (steps 6, 7) can be written to disk or reassigned to other use. Otherwise, if the system crashes before the modified directory entry is recorded on disk but after the inode has been reassigned to other use (for example, after step 7), then when the system is rebooted, the directory entry would still exist and identify the old file as valid, although the inode is reassigned. To the user, it would appear that the old file's name now refers to a different, newly created file.

Similarly, the inode, with its data block pointers zeroed out (step 4) must be written to disk before the freed data blocks can be allowed to appear on the free list (step 5). Once a data block is returned to the free list, it can get reassigned to another use, and if the ordering between step 4 and step 5 is not enforced and a system crash happens before the inode is written, a single data block can become part of more than one file.

File system modules which require ordered disk writes for file system repairability have implemented this ordering using synchronous writes. In the example of TABLE 1, the writes at steps 2 and 4 are done synchronously; thus ensuring that step 4 has completed before step 5, and step 2 has completed before steps 6 or 7.

In a synchronous write, the process issuing a disk write waits for the write to complete before continuing execution. Because typical delays in writing to disks are of a magnitude comparable to the time it would take for the processor to execute thousands of instructions, when a process needs to wait for a disk write to complete, the process control subsystem reassigns the processor to some other process that is ready to continue. Thus, synchronous disk writes give rise to context switches.

Some consequences of using synchronous writes are described in connection with an example which consists of the execution of the UNIX system command:

rm file1 file2 file3 where the command (rm) removes three files (file1, file2, file3) in a single directory. For purposes of this example, the directory entries for all three files are in the same buffer of the directory, as would be typical for moderate sized directories. Also, in the example, the inode data for file2 and file3 are stored in the same buffer while the inode data for file1 is in a separate buffer.

Figure 3:
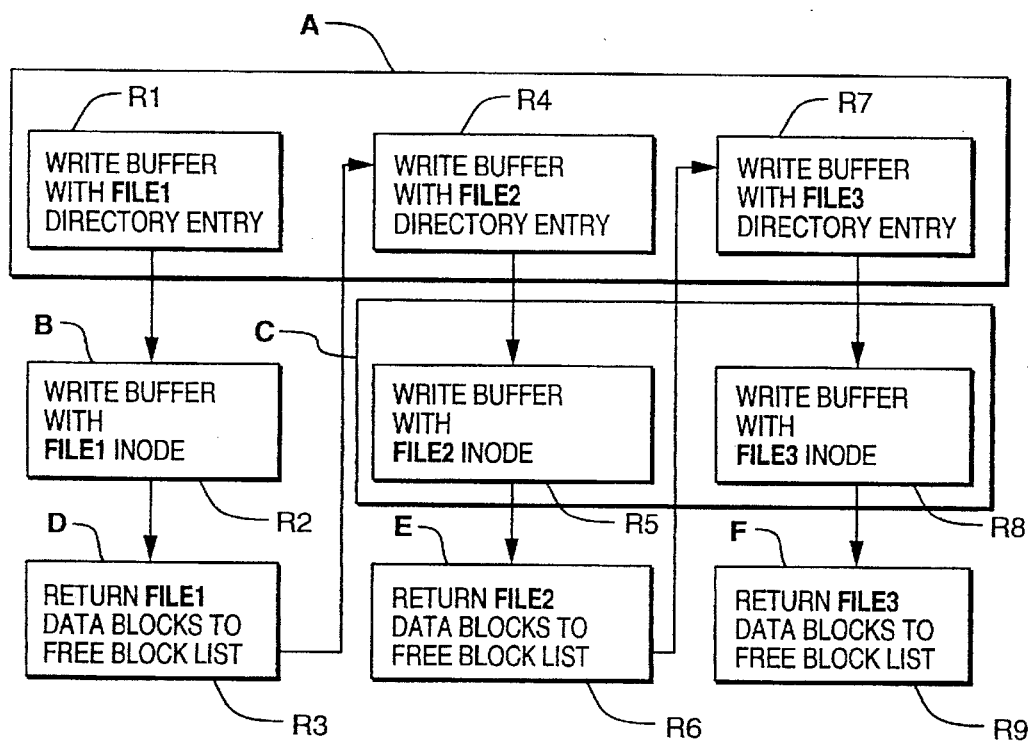
FIG. 3 depicts a block diagram of an example of the processing of a remove (rm) command that causes writes in the system of FIGS. 1 and 2 using synchronous writes.

Operation Of rm Command—FIG. 3

FIG. 3 illustrates the operation of the above rm command in a UFS file system implementing ordering by using synchronous writes. It shows the ordering requirements for each file, based on the implementation of file removal procedure described in TABLE 1. FIG. 3 corresponds to a sequence of requests R1, R2, ..., R9. Note that for each file, the order dependencies are that the buffer containing the directory entry must be written before the buffer containing the inode and the buffer containing the inode must be written before the data blocks are returned to the free list. In addition, FIG. 3 shows the additional order dependencies that each file is handled in sequence; all the actions for one file are performed before the actions for the next file and so on. In general, the order dependencies D1, D2, ..., D8 for requests R1, R2, ..., R9 of FIG. 3 are as follows:

D1: R1→R2

D2: R2→R3

D3: R3→R4

D4: R4→R5

D5: R5→R6

D6: R6→R7

D7: R7→R8

D8: R8→R9

The order dependency D1, for example, means in the expression R1→R2 that R1 is to be performed before R2. The eight order dependencies D1, D2, ..., D8 result from a simple time-order presentation of the requests R1, R2, ..., R9 so that a single time-order subset of order dependencies is formed D1→D2→D3→D4→D5→D6→D7→D8 meaning that the requests are specifically ordered as R1→R2→R3→R4→R5→R6→R7→R8→R9.

As shown in FIG. 3, there are two synchronous writes per file (requests R1, R2; R4, R5; R7, R8), resulting in a total of six writes to disk and six context switches. Note that one buffer contains all three directory entries (requests R1, R4, R7), and is thus written to disk three times, and, similarly, another buffer contains the inodes (requests R5, R8) for both file2 and file3 and is written to disk twice.

Comparison of Synchronous, Asynchronous, and Delayed Disk Writes

Asynchronous writes, and Delayed writes are two alternatives to Synchronous writes, and they are used commonly by various file system implementations for writes to disk because of their less adverse impact upon performance.

TABLE 2 provides a comparison of the three write operations used in the kernel.

TABLE 2

|  | Synchronous | Asynchronous | Delayed |
|---|---|---|---|
| 1. Writes to Disk When? | Immediately | Immediately | Later |
| 2. Data Integrity | High | High | Medium |
| 3. Ratio to Actual Disk Writes | 1:1 | Marginally > 1:1 | Many: 1 |
| 4. Waits for Disk Write to Complete? | Yes | No | No |
| 5. Can be used for Ordering? | Yes | No | No |
| 6. Causes Context Switches? | Yes | No | No |
| 7. Disk Throughput Limits Program? | Yes | Somewhat | Minimal |

As shown in TABLE 2, each write operation provides a different tradeoff among various characteristics. Synchronous and asynchronous writes provide greater integrity on secondary storage in the event of machine failure (see line 2 of TABLE 2), while the use of delayed writes gains the benefit of improved performance but is more vulnerable to a system crash. Since delayed writes minimize the coupling between disk subsystem and the CPU (line 7), as well as reduce the actual number of disk writing by promoting write caching (line 3), they tend to be best suited for achieving high system throughput; and since they do not cause extra context switches (line 6), they improve individual response times as well.

Delayed Ordered Writes (DOW)

The Delayed Ordered Write (DOW) subsystem 30 of FIG. 2 of the present invention provides a more efficient solution to the disk write ordering problem. DOW, implemented in one embodiment in a UNIX Operating System, doubles system performance by reducing the amount of disk traffic as well as the number of context switches generated by synchronous writes. DOW provides a mechanism for controlling the order in which modifications of file system structural data are recorded on disk, without using the one-disk-write-at-a-time style of synchronous disk writing. Large gains in system performance have resulted from using DOW in place of synchronous writes within the UFS file system implementation. These advantages are obtained without requiring a structural redesign or a change in the media format for UFS.

DOW includes two parts. The first part is an interface by which file system implementations, or any kernel subsystem, specify the sequences in which modifications of file system data blocks can be recorded on disks. These sequences translate into ordering dependencies among disk blocks themselves, which are collectively represented by an ordering graph (entries in an ordering store), prepared by DOW in response to the specification. The second part of DOW consists of mechanisms responsible for ensuring that the operations of the ordering graph (indicated by the entries in the ordering store) are performed in the order specified.

DOW is a modular service, loosely coupled with other kernel subsystems, including the file system implementations which use it. In the preferred embodiment, no modifications are made to other kernel subsystems (including device drivers) or to the standard file system interfaces. The changes to the file system implementations that choose to employ the DOW mechanism are simple in place code substitutions in which synchronous writing is replaced by calls into the DOW subsystem for recording the needed ordering entries.

Any file system implementation in the operating system can therefore use DOW easily, without structural redesign and the loss of media compatibility that might otherwise result. Furthermore, while DOW provides the mechanism for ordering disk write operations, the file system retains control of the policy for ordering, that is, which disk write operations should be ordered and how.

Terminology and Conventions

For an exposition of how the DOW subsystem 30 works, it is useful to represent the actions that need to be performed in a time order as nodes (operation entries) of a graph and to represent the time ordering constraints as directed links (order entries) between the nodes. The nodes and links in the graph are stored as entries located in an ordering store for example in system memory such as main store 11 of FIG. 1.

The graph in the ordering store is called a DOW ordering graph or simply an ordering graph. The actions that are represented by the nodes of the ordering graph for write operations are of two types: (1) writing of data to disk, and (2) execution of some function that needs to be time ordered relative to writing of some data to disk. For example, in FIG. 3, the functions which return the disk blocks of the removed files to the file system free list (requests R3, R6, R9), are represented in a DOW ordering store by nodes of the second type. A node of type (2) is called a function node, and the ordered function call that is represented by a function node is called a deferred procedure call.

For convenience of description, the nodes in an ordering graph are identified symbolically as N1, N2, ..., Nn. An ordering constraint between two nodes N1 and N2 of the ordering graph, such that the action corresponding to N1 must happen before the action corresponding to N2 can happen, is represented by a link directed from N1 to N2—or, in text as N1→N2.

The execution of a node in the ordering graph refers to the action of performing the task that is represented by that node. Thus, executions of DOW graph nodes result either in the writing of a particular data item to secondary storage, or, in the case of function nodes, the execution of the procedure call that the function node represents.

For two nodes N1 and N2 in the ordering graph, if a link N1→N2 exists, then N1 is called a predecessor of N2 since N1 must be executed before N2 can be executed. Alternatively, since the execution of N2 depends upon the execution of N1, N2 is called a dependent of N1.

As defined above, the ordering graph is directed that is, any link between two nodes in the ordering graph is directed from one node to the other, to represent the ordering requirement between the actions that correspond to the two nodes. In addition, an important characteristic of the ordering graph is that at all times, it is free of cycles. If a cycle existed, for example, among 3 nodes N1, N2, and N3 of the ordering graph due to links N1→N2, N2→N3, and N3→N1, then the ordering constraints suggested by the three links would be self-contradictory, since at least one of the three constraints that the links represent would be violated in any order in which N1, N2, and N3 are executed. Therefore the ordering graph does not contain cycles, and is said to be a directed acyclic graph.

Reducing Disk Writes with Delayed Ordered Writes

Delayed Ordered Writes (DOW) combines delayed writes with an ordering store mechanism for controlling the order in which data is written to disk. Thus, the use of DOW allows the system to obtain the performance improvement associated with delayed writes while retaining the file system recovery capability that is provided by synchronous writes.

FIG. 3 is analyzed to understand the transformation from synchronous writes to delayed ordered writes. The "**" boxes (A and C) in FIG. 3 represent disk blocks having contents updated in more than one sequence of ordered modifications. The one-at-a-time handling of file removals which occurs as a result of synchronous writes, as described above in connection with FIG. 3 and TABLE 1 is not necessary for repairability, so the sequencing shown in FIG. 3 between boxes R3 and A(R4), and between boxes R6 and A(R7) can be removed. With these changes, the control flow of FIG. 3 is transformed into a directed acyclic graph.

Figure 4:
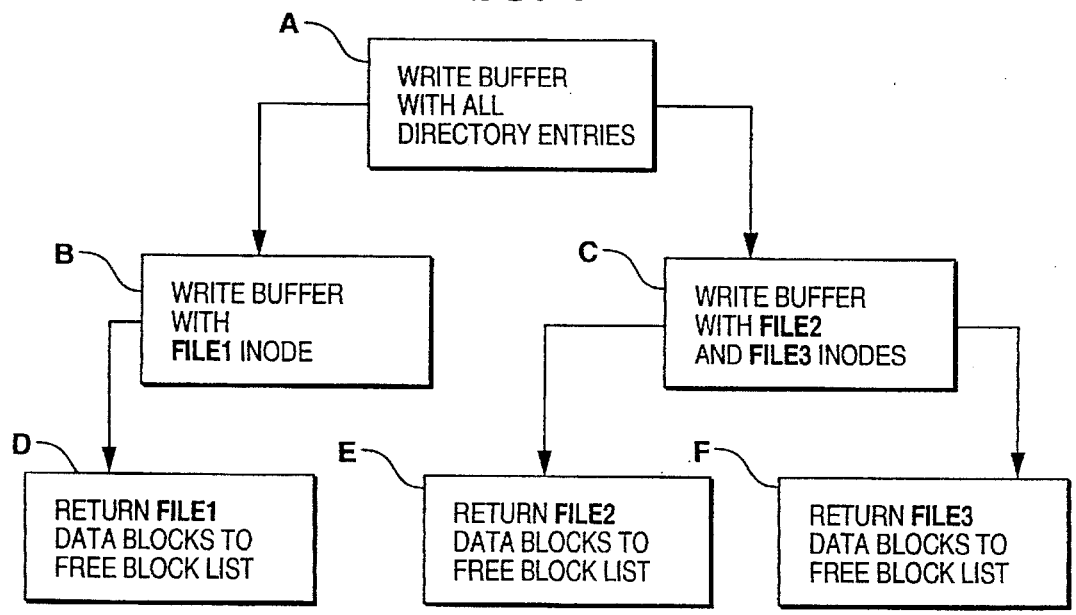
FIG. 4 depicts a block diagram of a directed acyclic graph for the FIG. 3 example of the processing of a remove (rm) command that causes writes in the system of FIGS. 1 and 2 using delayed ordered writes (DOW).

Directed Acyclic Graph—FIG. 4

The directed acyclic graph of FIG. 4 includes the nodes A, B, ..., F by merging disk write requests (R1, R4, R7 and R5, R8 of FIG. 3) of the same buffer that are common to multiple sequences into a single disk write of the buffer. Merging common data into a single write in this example reduces the total number of disk writes from six (R1, R2, R4, R5, R7, R8) to three (A, B, and C), while continuing the proper ordering among the disk writes.

FIG. 4 also illustrates the use of deferred procedure calls (nodes D, E, and F), which represent other actions to be completed in the prescribed order relative to the delayed, ordered disk write operations. The nodes D, E, and F in FIG. 4 each represent a procedure to be executed for returning the data blocks of a removed file to the free list, but the procedure can be permitted to execute only after the inode for the removed file is written to disk with its data block pointers zeroed. This ordering is specified by creating a graph node which corresponds to the inode buffer, creating another graph node corresponding to a procedure that would free the data blocks for the inode, and then specifying that the procedure can be invoked only after the inode buffer is written to disk.

Finally, note that unlike the synchronous write operations of FIG. 3, the ordering graph of FIG. 4 is only partially sequential and represents a partial ordering among multiple subsets of file system data structure modifications—some of which may, therefore, execute concurrently. Specifically, in FIG. 4, the common order dependencies CD1 and CD2 for a first subset are:

CD1: A→B

CD2: B→D

The common order dependencies CD3, CD4, and CD5 for a second subset are as follows:

CD3: A→C

CD4: C→E

CD5: C→F

Note that the first and second subsets of common order dependencies for FIG. 4 are independent of each other.

Figure 5:
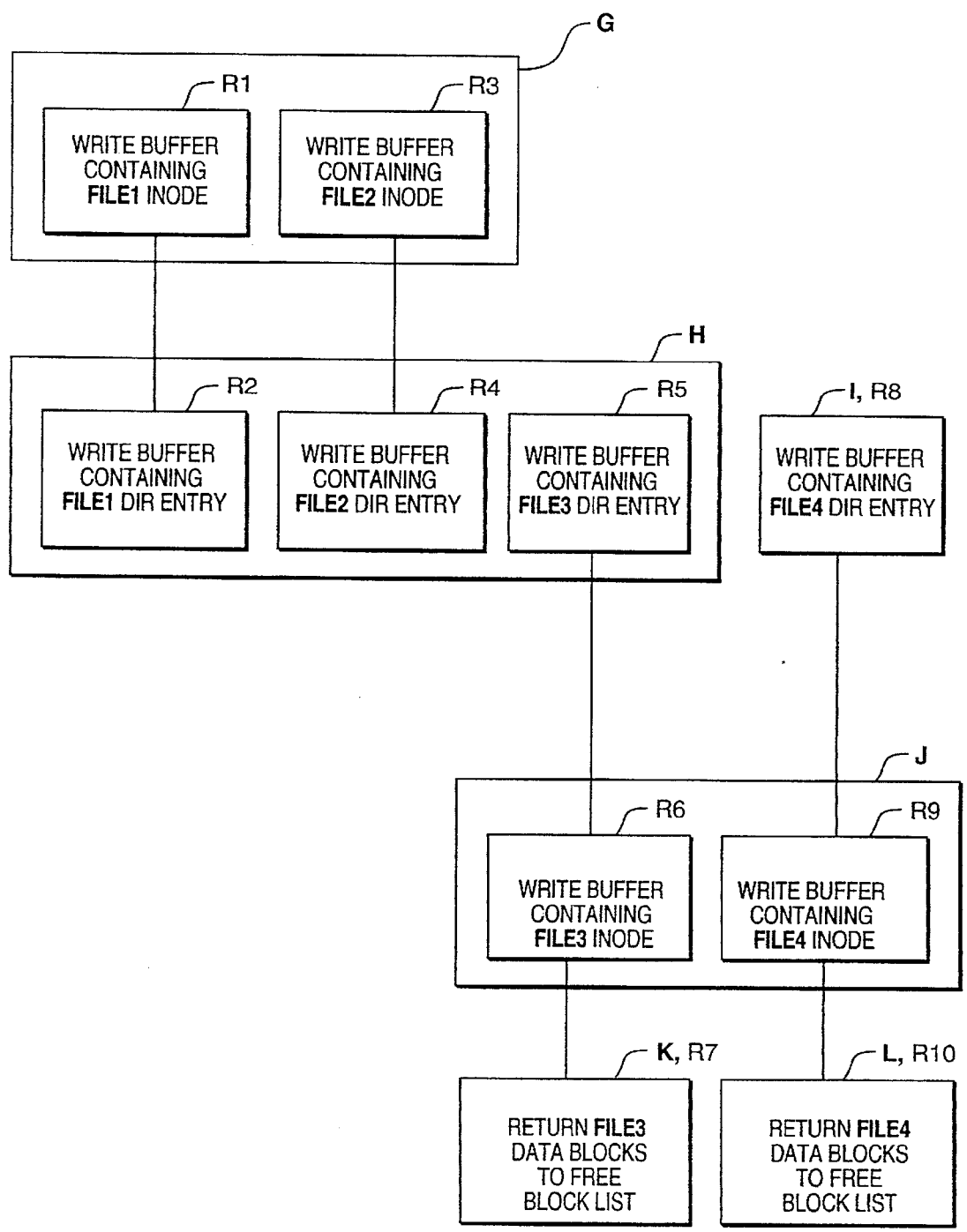
FIG. 5 depicts a block diagram of an example of the processing of two touch commands and two remove commands that cause writes in the system of FIGS. 1 and 2 using synchronous writes.

Four Process Example—FIG. 5

The operation of delayed ordered writes is further illustrated by a second example in FIG. 5. In this example, it is assumed that four processes operate separately on files in a directory. Two of the processes each create a file by using the unix touch command:

| touch | filename |
| --- | --- | which creates a zero-length file called filename if it does not already exist in a directory. The other two processes each remove a file from the directory using the unix rm command. The four processes execute these commands, in the same directory:

| Process 1 | Process 2 | Process 3 | Process 4 |
| --- | --- | --- | --- |
| touch file1 | touch file2 | rm file3 | rm file4 |

When creating a file name in a directory, a process increments the link count in the inode for the file and adds the file name to the directory. It is only after the increased link count is safely written to disk that the file name itself can be added to the directory buffer. Otherwise, an intervening system crash would cause the file inode to have a smaller link count than the number of actual directory entries referencing the file so that a file system repair utility could not correctly determine a proper recovery action, and so would be forced to leave the file in the directory from which it was being unlinked prior to the system crash.

FIG. 5 illustrates the steps followed by each of the processes in accordance with the ordering dependencies that apply to creating and removing files. For purposes of this example, assume that the inodes for file1 and file2 are in one buffer and that the inodes for file3 and file4 are in another buffer. Also, assume that the directory entries for file1, file2, and file3 are in the same page buffer; and the directory entry for file4 is in another buffer.

The four processes run independently. The time order of each update request per process is important and the overall time order of all the requests will be gone interleaving of all the per-process requests. The overall time order is unimportant, so long as the order dependencies of update requests within each process are preserved. The order dependencies of FIG. 5 are as follows:

D1: R1→R2

D2: R3→R4

D3: R5→R6

D4: R6→R7

D5: R8→R9

D6: R9→R10

Figure 6:
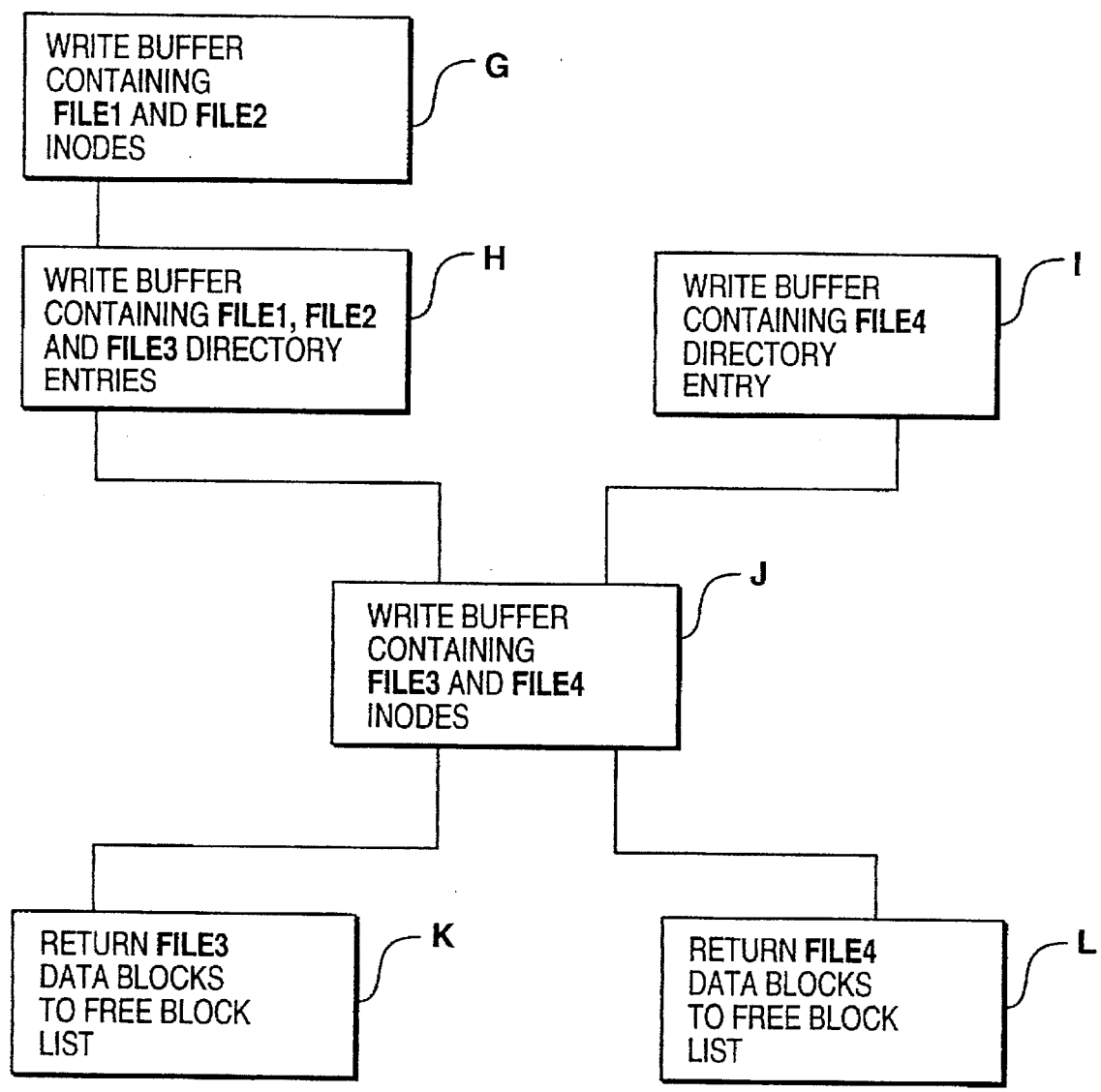
FIG. 6 depicts a block diagram of a directed acyclic graph for the FIG. 5 example of the processing of commands that cause writes in the system of FIGS. 1 and 2 using delayed ordered writes (DOW).

Directed Acyclic Graph—FIG. 6

FIG. 6 shows how the ordering requirements of FIG. 5 can be met by using DOW so that it is possible to combine the common elements among the steps taken by the four processes. While the resulting overall order among all the steps is different, the sequencing of steps within each process is preserved. Specifically, the common order dependencies of FIG. 6 preserve the order dependencies of FIG. 5 while reducing the number of separate operations required. Specifically, in FIG. 6, the common order dependencies are:

CD1: G→H

CD2: H→J

CD3: I→J

CD4: J→K

CD5: J→L

The common order dependencies CD1, CD2, . . . , CD5 OF FIG. 6 preserve the order dependencies D1, D2, . . . , D6 of FIG. 5.

Constructing An Acyclic Ordering Graph

The potential I/O reduction from delayed ordered writes relies on combining delayed writes with a control mechanism based on an order store storing entries, which constitute a directed acyclic graph, in which the graph represents ordering dependencies among data modifications. TABLE 3 presents a summary of the DOW procedures that are available to file system implementations for use in constructing the ordering graph in the ordering store.

TABLE 3

| Routines for Constructing an Ordering Graph | |
| --- | --- |
| dow_create | Create, if it does not exist, a node in the ordering graph which corresponds to either a delayed write buffer or a deferred function execution, and return an integer identifier which may be used to reference that node. |
| dow_order | Specify an ordering between two nodes in the ordering graph. |
| dow_startmod | Indicate that data in a buffer is about to be modified. |
| dow_setmod | Indicate either that modification of data in a buffer, or the setup for a deferred function execution, has completed. |
| dow_rele | Release a hold on a node identifier. |
| dow_abort_range | Destroy all nodes in the graph corresponding to a range of buffers in a particular file. |

In TABLE 4 below, a code sketch in C language illustrates the transformation from the example of FIG. 3 to the ordering graph of FIG. 4 using the routines of TABLE 3.

TABLE 4

| File Removal using Delayed Ordered Writes | |
| --- | --- |
| Iteration 1, 2, 3 | Operation |
| | 1 dowid_t pgdow, ibdow, fdow; |
| | 2 /* |
| | 3 * make a node in the ordering graph corresponding |
| | 4 * to directory buffer which contains the directory |
| | 5 * entry of the file being removed, and then clear |
| | 6 * the file's directory entry. |
| | 7 */ |
| A, (A), (A) | 8 pgdow = dow_create(directory buffer containing entry); |
| | 9 dow_startmod(pgdow); |
| | 10 |
| | 11 . clear the portion of the directory buffer containing |
| | 12 . the directory entry of the file being removed. |
| | 13 . |
| | 14 dow_setmod(pgdow); |
| | 15 |
| | 16 /* |
| | 17 * make a graph node corresponding to the |
| | 18 * inode buffer, and set up ordering to write |

TABLE 4-continued

File Removal using Delayed Ordered Writes

| Iteration 1, 2, 3 | Operation |
|---|---|
|  | 19 * the inode buffer to disk after the directory |
|  | 20 * buffer is written to disk. |
|  | 21 */ |
| B, C, (C) | 22 ibdow = dow__create(inode buffer); |
| A→B, A→C, (A→C) | 23 dow__order(ibdow, pgdow, 0); |
|  | 24 dow__startmod(ibdow); |
|  | 25 . |
|  | 26 . Decrement the inode link count and zero out |
|  | 27 . the inode data block pointers |
|  | 28 . |
|  | 29 dow__setmod(ibdow); |
|  | 30 /* |
|  | 31 * set up ordering: call function to free |
|  | 32 * the blocks after writing the inode. |
|  | 33 */ |
| D, E, F | 34 fdow = dow__create(function to free data blocks, |
|  | 35 block list specification); |
| B→D, C→E, C→F | 36 dow__order(fdow, ibdow, 0); |
|  | 37 dow__setmod(fdow); |
|  | 38 . |
|  | 39 . mark the inode as free and return the inode |
|  | 40 . to the free inode list |
|  | 41 |
|  | 42 /* |
|  | 43 * release the node identifiers |
|  | 44 */ |
|  | 45 dow__rele(pgdow); |
|  | 46 dow__rele(ibdow); |
|  | 47 dow__rele(fdow); |

For the example of FIG. 3, the code in TABLE 4 is executed three times, once for each file that is removed, by the file system implementation that is a client of the DOW facility. The code segment appears in the right column, marked "Operation". The left column describes how, during each of the three iterations, the execution of the code in the right column results in the construction of the ordering graph of FIG. 4. In the left column, at lines 8, 22, 23, 34, and 36, are three comma separated entries; these entries identify the nodes or links in the ordering graph that result from the execution of the corresponding lines of code in the right column during the respective iterations.

In the code sketch, line 1 is a declaration of three DOW identifiers, called pgdow, ibdow, and fdow; respectively, these variables are used to store identities of graph nodes corresponding to disk write of a page, disk write of a buffer, and a deferred procedure call. Lines 2–7, 16–21, 30–33, and 42–44 are comments.

During the first iteration: At line 8, the file system implementation requests the DOW subsystem via dow__create to map a directory page in which the entry for file1 exists, to a DOW node. The result of this mapping, is to have in the variable pgdow, the value of the DOW node identifier for the directory page which will need to be modified in order to remove the files name entry. This is shown in the left hand column as the creation of node A of FIG. 4.

Before proceeding to modify the directory page, the file system implementation signals its intent to the DOW subsystem by issuing the dow__startmod call (line 9) for pgdow. After that, in lines 10–13, the actual modification occurs, the code for which is not different in absence of DOW, and is not shown for brevity. Then at line 14, the file system implementation calls dow__setmod for pgdow, to sign at to the DOW subsystem that the modification is complete.

At line 22, dow__create is called again for creating a second DOW node, corresponding to the buffer in which the inode for file1 resides. The result is to have the variable ibdow contain the DOW node identifier for the buffer which contains the inode, and which will need to be modified and written to disk. This is shown in the left hand column as the creation of node B of FIG. 4.

At line 23, the ordering constraint between pgdow and ibdow is specified via dow__order. The effect of this is to insert a link directed from pgdow to ibdow, that is, from A to B in terms of FIG. 4.

As in the case of pgdow, the intent to modify the inode (and hence the buffer which contains the inode) is signaled at line 24 by the call to dow__startmod for ibdow. Again, the actual modification is not shown for brevity because it is independent of DOW usage, and happens in lines 25–28. Then, at line 29, the indication that the buffer is modified as desired, is given to the DOW subsystem via the call to dow__setmod.

At line 34, the file system implementation calls dow__create to request the creation of a function node. The deferred procedure call to which the function node is mapped, is one that would need to be executed in order to return the freed data block from file1 to the disk block free list in the file system. This creates node D for the ordering graph shown in FIG. 4; the identifier for the node is kept in the variable fdow.

At line 36, the ordering constraint between ibdow and fdow is specified via dow__order. The effect is to insert a link directed from ibdow to fdow, that is, from B to D in terms of FIG. 4.

Enlisting the ordering constraint at line 36 effectively completes the setup of the function node; hence the dow__setmod call is used at line 37 to signal the readiness of the function node for execution at any following time. All necessary ordering actions have been represented at this point, so the three DOW nodes can be released at any time.

Actually, the node pgdow could be released at any time after line 24. The DOW nodes, pgdow, ibdow, and fdow, are released in lines 45–47.

During the second iteration: As in the case of the first iteration, at line 8, the file system implementation requests the DOW subsystem (via dow__create) to map a directory page in which the entry for file2 exists, to a DOW node. Since the entry for file2 is in the same directory page as for file1 the result of this mapping is to have in the variable pgdow, the same DOW identifier as in the first iteration; that is, the node A in FIG. 4. At line 22, when a DOW node for mapping the buffer containing the inode for file2 is requested, the result is that a new identifier is created and written into the variable ibdow. This new node is shown as the node C in FIG. 4, and in the left hand column in TABLE 4.

At line 23, the ordering constraint specified between pgdow and ibdow via dow__order results in the directed link from A to C in terms of FIG. 4. At line 34, a new function node is requested for mapping to the deferred procedure call that would release the disk blocks from file2 to the file system free list. This creates the node E for the ordering graph shown in FIG. 4; the identifier for the node is kept in the variable fdow. At line 36, the ordering constraint between ibdow and fdow is specified. The effect is to insert a link directed from ibdow to fdow, that is, from C to E in terms of FIG. 4.

During the third iteration: The third iteration, for the removal of file3, proceeds analogously to the first two iterations. In this iteration, the directory entries for file3 and file2 share the same page and the inodes for the two files reside in the same disk block. Hence, at lines 8 and 22, the same DOW identifiers are returned for the two iteritions. At line 23, the ordering constraint that is specified between pgdow and ibdow, results in no new work since the ordering link from A to C was already created in iteration 2.

At line 34, a new function node is requested for mapping to the deferred procedure call that would release the disk blocks from file3 to the file system free list. This creates the node F for the ordering graph shown in FIG. 4; the identifier for the node is kept in the variable fdow. At line 36, the ordering constraint between ibdow and fdow is specified, whose effect is to insert a link directed from ibdow to fdow, that is, from C to F in terms of FIG. 4.

Thus when all three iterations are completed, the DOW subsystem has the necessary ordering requirements between the various disk writes and the deferred procedure calls in place, to resemble the ordering relationships of FIG. 4.

File system implementations typically use these DOW functions in conjunction with modifying structural data. For the example in TABLE 4, the modifications of structural data occur in lines 10–13, 25–28, and 38–41, identically with the usual synchronous write based implementation. With the synchronous write based ordering, the modifications are followed by disk writes; with DOW, the modifications are followed by the primitives that construct the ordering graph.

The general outline followed by a DOW client when modifying a datum which must be written to disk in an ordered fashion is described in TABLE 5 as follows:

TABLE 5

1. Create a graph node corresponding to the datum and acquire a node identifier referencing the node by calling dow__create.
2. If there is a datum which must be written prior to this datum, use dow__order to specify an ordering between the two nodes TABLE 5-continued representing these two data items.
3. Call dow__startmod to indicate that this datum is about to be modified.
4. Modify the datum.
5. Signal that the modification is complete, by using dow__setmod to mark the graph node as "modified".
6. Finally, at any point after the last dow__order or dow__setmod call involving this graph node, release the graph node through a call to dow__rele.

The functions dow__startmod and dow__setmod provide coordination points between a client of DOW and the DOW subsystem. They are used to notify the DOW subsystem that the client is modifying a page or a buffer that corresponds to a node in the ordering graph.

One key aspect is the rule:

When establishing an ordering between first and second operations (between first and second common writes or a first common write and a function), dow__order is called only after dow__setmod for the first common operation has completed, but before dow__startmod for the second common operation is called.

The reason for the rule can be understood as follow:

1. After dow__order is called, the associated writes of data can occur at any time. If the call to dow__order takes place before modifying the first data, then the first data may be written to disk before its modification is effective. The ordering requirement is violated if the second data is then written to disk.
2. Until dow__order is called, the writes of each data are unordered relative to each other. If the second data is modified before the call to dow__order, the second modification can become effective on disk before the modification of the first data has propagated to disk.

DOW Subsystem Data Structures

The data structures used for representing the DOW nodes (operation entries) and their ordering linkage (order entries) exist in an ordering store. The DOW ordering store is constructed from two types of data structures, dow-nodes (identifying operations) and dow-link-elements (identifying ordering among operations). Dow-nodes represent operation entries in the ordering graph and dow-link-elements represent linkages (ordering) between graph nodes.

Figure 7:
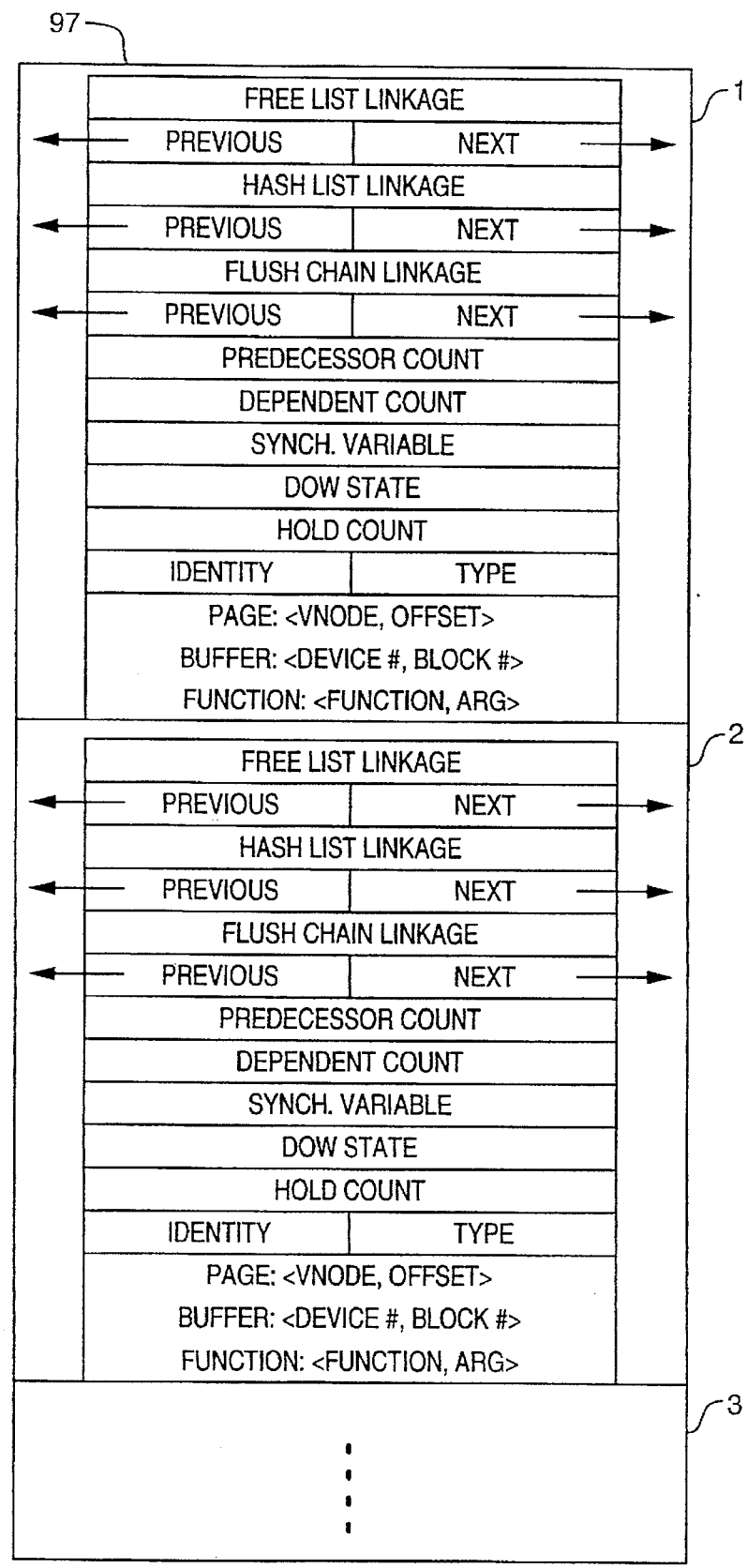
FIG. 7 depicts an array of data structures that constitute the operation (node) entries in an ordering store.

Fields For Operation Entries Of Ordering Store (DOW-Node)—FIG. 7

Each DOW-node contains information identifying the operation specified by a graph node as well as other information about the dow-node itself. Storage for dow-nodes is obtained from a statically configured array, as shown in FIG. 7. Each node is identified by its dow-id, which is its index in this array. For convenience and memory economy, linked lists of dow-nodes are constructed using dow-ids rather than memory addresses.

In FIG. 7, the fields of dow-node ordering store entries for node N1 and N2 from an array N1, N2, . . . , Nn of nodes are shown. Each node includes the following fields:

Free list linkage.

Linkage for a doubly linked list of unused dow-nodes.

Hash list linkage.

Linkage for a doubly linked list of in-use dow-nodes, hashed by identity. Used to speed searches for a dow-node for a particular operation.

Flush chain linkage.

The Flush Chain Linkage (FCL) is a linkage for the doubly linked list of dow-nodes whose operations are to be executed.

Predecessor count.
   The number of predecessor nodes.
Dependent count.
   The number of dependent nodes.
Synch. Variable.
   A variable for synchronization.
DOW State.
   Tracks state information such as whether the dow-node's operation is ready to be initiated, whether the operation has been initiated, whether the operation has completed, or whether the nodes' predecessors have been searched.
Hold Count.
   A field used for counting.
Type.
   The type of operation represented by the node, for example a write of a page, a write of a buffer, or a deferred procedure call.
Identity.
   Parameters of the delayed operation that the dow-node represents:
   For a page write, the identify field specifies a inode and offset which identifies the page.
   For a buffer write, the identity field specifies a device number and block number which identifies the buffer.
   For a deferred procedure call, the identify field specifies the address of the procedure and an argument to be passed to the procedure.
   For each dow-node, there are two linked lists of dow-link-elements, termed the predecessor list and the dependent list. The predecessor list for a dow-node is a doubly linked list of dow-link-elements which point from that dow-node to the dow-nodes of its predecessors in the graph. Similarly, the dependent list for a dow-node is a doubly linked list of dow-link-elements which point from that dow-node to the dow-nodes of its dependents in the graph.
   As with dow-nodes, storage for dow-link-elements is obtained from statically configured arrays; each dow-link-element is identified by its dow-link-id, which is its index in this array; and linked lists of dow-link-elements are constructed using their dow-link-ids rather than their memory addresses.

Figure 8:
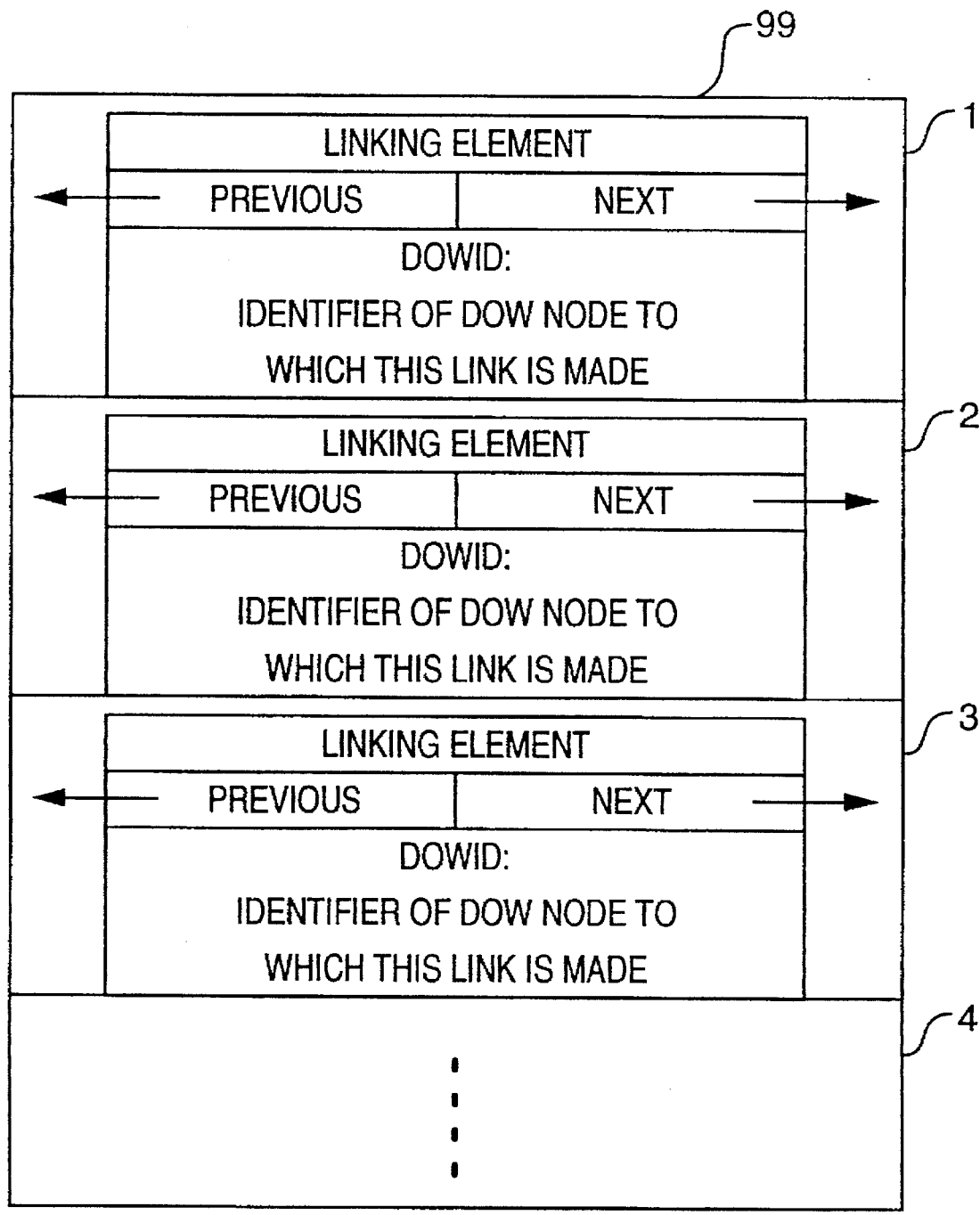
FIG. 8 depicts an array of data structures that constitute the order (link) entries in an ordering store.

Fields For Order Entries Of Ordering Store (DOW-Link Element)—FIG. 8

In FIG. 7, the fields of DOW-Link-Element (DLE) ordering store entries for node D1, D2 and D3 from an array D1, D2, . . . , Dm are shown. Each entry includes the following fields:
Linking Element.
   Linkage field for forward and backward chaining of DLEs for forming lists.
DOWID.
   The dow-id of the predecessor or dependent dow-node to which the dow-link-element points.
   For example, consider a link A→B in an ordering graph. The dow-nodes for A and B would each have two lists of DLEs, one for dependents and one for predecessors. One of the DLEs on A's dependent list would contain in its dow-id field the dow-id of B. Similarly, one of the DLEs on B's predecessor list would contain in its dow-if field the dow-id of A.
   The two DLEs—one on the dependent list for A and the other on the predecessor list for B are called inverse-links of each other. A DLE contains an additional field identifying its inverse-link, but this is omitted in FIG. 8 for simplification.

Figure 9:
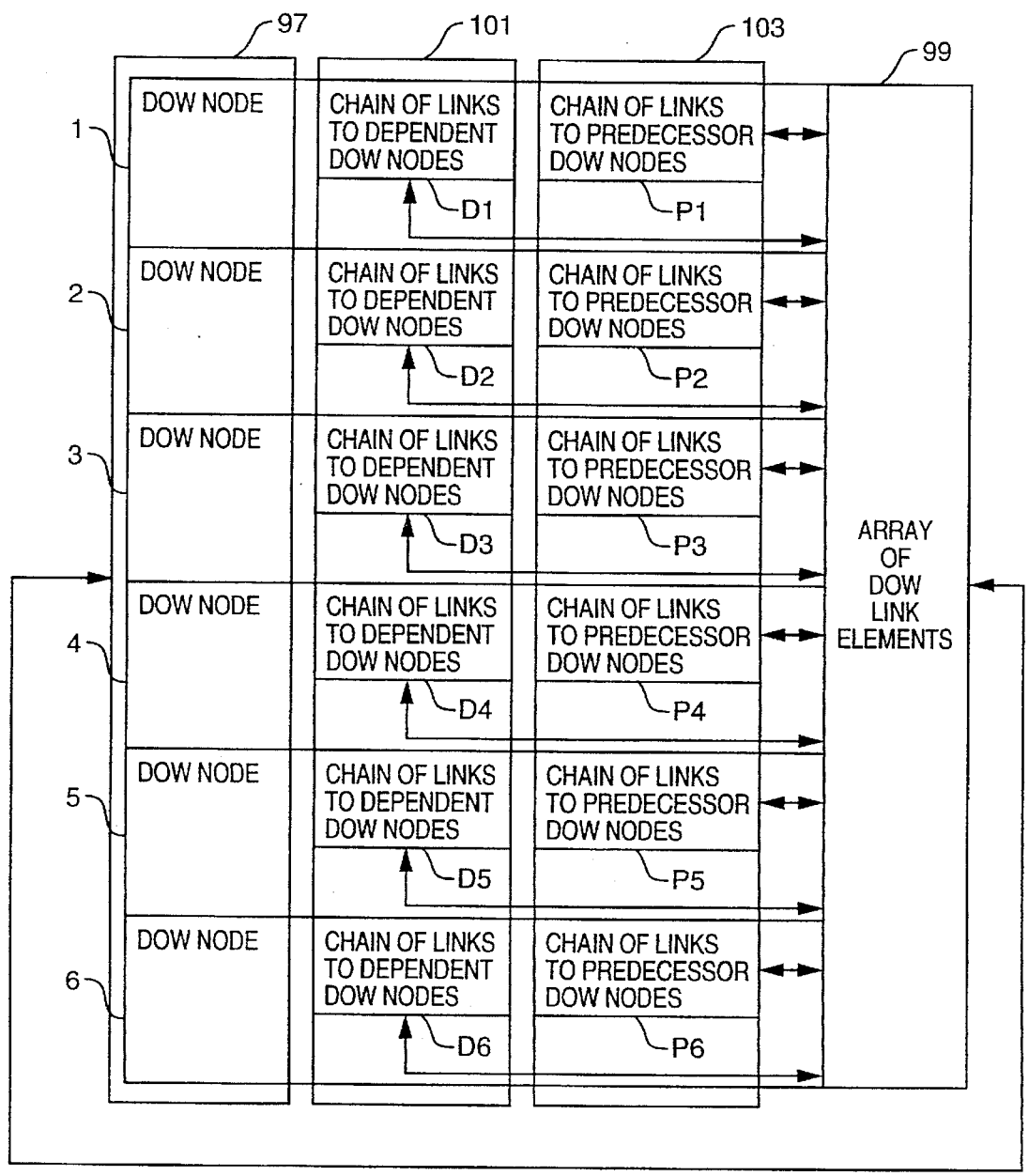
FIG. 9 depicts the manner in which predecessor and dependant entries are organized using pointers in the ordering store.

DLE Arrays—FIG. 9

While there are two DLE lists (one for predecessor dow-nodes and the other, for dependent dow-nodes) for each dow-node, the lists are not anchored at any field of the dow-node structure. Instead, the anchors for these lists are provided by two special array of DLEs. This structure is shown in FIG. 9. Placing the storage for the heads of these lists in special DLE arrays as shown in FIG. 9 simplifies the linked list management. Except for this detail, the anchors can be viewed simply as parts of the dow-node structure that are given separate storage.

Figure 10:
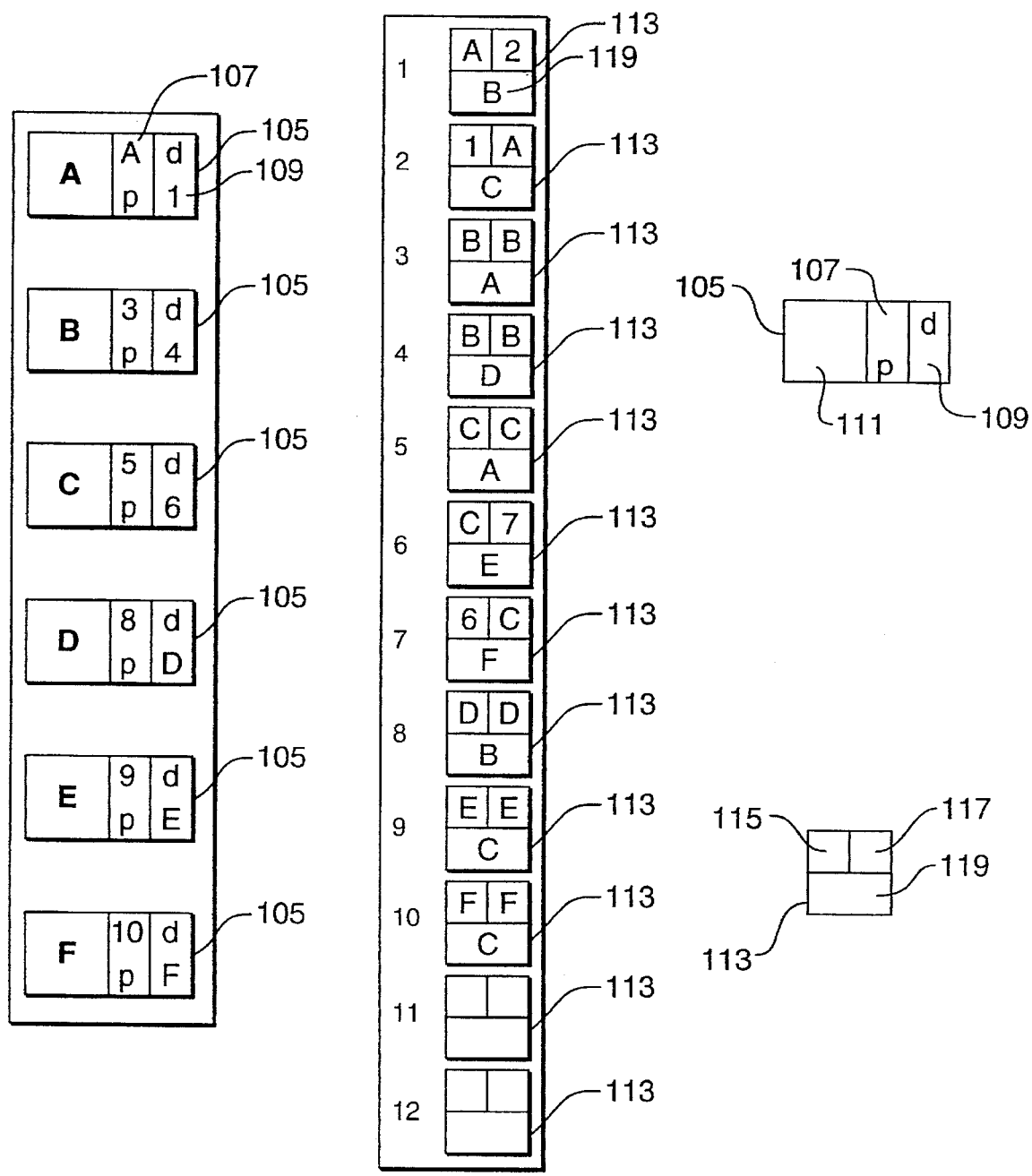
FIG. 10 depicts the ordering of entries in the ordering store for the FIG. 4 example.

Example Of Dow-Node And DLE Structures—FIG. 10

FIG. 10 contains an example of the organization of the dow-node and DLE structures for representing the ordering graph of FIG. 4. In this example, the anchors for the predecessor and the dependent dow-nodes lists are treated as extensions of the dow-node as a simplification for purposes of explanation.
   Consider dow-node for A. Its predecessor list is empty; its dependent list contains DLEs 1 and 2. The dow-id for DLE 1 is the dow-node for B while the dow-id for DLE 2 is the dow-node for C. In this way, B and C are identified as dependents of A. Next consider the dow-node for B. Its predecessor list consists only of DLE 3. The dow-id field of DLE 3 contains the identifier for A thus recording that A is B's sole predecessor. The dependent list for B also consists of only one element, namely, DLE 4, The dow-id field of DLE 4 identifies D as the sole dependent of B. In a similar manner, the other dow-nodes in the organization of lists in FIG. 10 represent the ordering links of FIG. 4.

Executing the Ordering Graph

In addition to primitives for constructing the ordering graph, the delayed ordered writes facility implements the mechanisms to carry out the operations represented in the ordering graph in the order specified by the graph. Execution of a node in the ordering graph is defined as the operation of performing the action that is represented by the node; it may be, for example, either the writing of a buffer to secondary storage or the invocation of a deferred procedure call. Execution of the ordering graph consists of the procedures that are followed by the DOW subsystem to ensure that executions of nodes in the ordering graph are performed in the prescribed order.
   Execution of nodes in the ordering graph generally starts when a kernel subsystem, such as a file system module, requests an operation on a buffer corresponding to a node in the ordering graph. When this happens, the DOW subsystem must mediate and ensure that all operations that must precede the requested operation are performed before the requested operation and in the proper order. In this way, a request from a kernel subsystem for carrying out a specific action, translates for the DOW subsystem into an execution of the node that represents the action in the ordering graph. The execution of that node, in turn, may require executions of other nodes in the ordering graph that are predecessors of the node.
   In addition to an eternally requested operation causing the need for such execution, the DOW subsystem itself needs to undertake node executions in response to a dow order, if, the addition of a specified ordering would cause a cycle in the ordering graph. This happens, for example, in a situation such as the following. Suppose that in the ordering graph, a chain of links,

{A→B, B→C, C→D} exists among nodes A, B, C, and D. Next, suppose a client of the DOW facility requests, via dow_order, the ordering D→A. Evidently, the desired ordering cannot be added to the graph without first removing one of the links that already exists between these nodes. The policy followed in the DOW subsystem is to issue a node execution either for A or D (the choice between executing A or D is made by the DOW subsystem, and is based on some optimality criteria). When the operation that is represented by a node in the ordering graph is completed, the DOW subsystem removes the links between the node and its dependent nodes, since the completion of that operation removes the ordering constraint that existed between that operation and others needing to follow it. So when node A, in the above example, is executed, the link A→B can be removed; this then permits the link D→A to be added without creating a cycle. Thus, the DOW subsystem may initiate the execution of the or more DOW nodes to occur, in order to accommodate a new ordering need specified by a client of the DOW subsystem.

The starting node in the ordering graph that is requested to be executed, is called the requested node. The DOW implementation performs node execution by searching the ordering graph (or sub-graph), staring from the requested node and identifying all the nodes that are predecessors of the requested node; it then searches each of these predecessor nodes to find their predecessors, and so on. Each identified node is marked with a special flag, so that it is recorded that the node must be executed as soon as its predecessors are executed. The nodes identified and flagged for execution in this manner are called pruned nodes. Searching upward in this manner, the DOW implementation identifies one or more nodes whose execution must be done fast; these are nodes that have no predecessors.

After identifying the nodes whose operations must be performed first, the DOW subsystem initiates these operations; they can be performed concurrently if there are multiple such nodes. Then, when these nodes have been executed, the DOW implementation traces back towards the requested node: it follows a method of initiating the operations on each of the pruned nodes whose predecessors have completed, and as outstanding operations complete, finds more pruned nodes that can be executed next—until the requested node is reached. Thus the DOW implementation meets the requirement that all the operations that need to be performed before the requested operation can be undertaken are indeed performed.

In the trivial case, if there are no nodes which must be executed before the requested node, the DOW subsystem can initiate the operation that corresponds to the requested node.

The actual implementation of the search for nodes to be pruned, and the carrying out of the actions that the nodes represent, is the result of two independent agents: a dow_strategy function, and a dow_flush daemon, communicating through a shared data structure called the dow_flush_chain. The dow_strategy function searches the ordering graph and identifies the nodes that need to be executed, and places these nodes on the dow_flush_chain, which is a queue of nodes. The dow_flush_daemon is a kernel process; it removes nodes from the dow_flush_chain and initiates their associated operations.

For the DOW subsystem to be able to mediate in this manner, the file system implementations that use the DOW facility must replace their calls to the device driver write strategy routines, with calls to the dow_strategy routine.

when dow_strategy receives a disk write request for a buffer, it searches for a graph node corresponding to the buffer. If no such node exists, or if the node exists but has no predecessor nodes, then dow_strategy simply forwards the buffer to the device driver by calling the device driver's write strategy routine.

On the other hand, if the node corresponding to the operation has one or more nodes preceding it in the graph, the dow_strategy function does not call the device driver directly. Instead, it searches for predecessor nodes and marks them pruned, and then proceeds to do the same with these predecessor nodes. When continuing this way, dow_strategy reaches nodes that have no predecessors, it places them on the dow_flush chain for execution by the dow flush daemon.

The dow_flush_daemon checks the dow_flush_chain periodically, and for each node on the flush chain, the dow_flush daemon initiates the needed deferred operation.

When a deferred operation on a buffer completes, the DOW subsystem receives control via a callback mechanism. Since the deferred operation is now completed, all dependence links between its corresponding node and other nodes in the graph are dismantled. If the node whose execution just completed was the last predecessor of some other graph node, and the latter node had been marked "pruned", then the latter graph node is now considered ready for execution. It is therefore placed on the dow_flush_chain, where it would be picked up by the dow_flush_daemon. Again, when the operations represented by these nodes are completed, their dependence links are dismantled, which may move additional nodes to the dow_flush_chain.

The process continues in this way, until the operations for all nodes preceding the originally requested node have been performed. At that point, the requested node is itself moved to the dow_flush_chain for handling by the dow_flush_daemon, which proceeds to call the needed device driver write strategy function. This completes the process of executing the requested node.

Execution of nodes in the ordering graph may be initiated for reasons other than a direct call to the dow_strategy function by the file system implementation, or because of the need to keep the ordering graph acyclic. Each deferred write operation is given a delay limit; when the limit is reached, and the operation is still pending, the operation is initiated by the DOW subsystem itself. This in turn may result in a graph search similar to that initiated by the dow_strategy routine. A deferred procedure all is not given a delay limit; it is carried out immediately after its last predecessor is executed.

EXAMPLE

FIGS. 11 through 14 illustrate this process using the ordering graph of FIG. 4. Note that the ordering graph of FIG. 4 was derived from the example of FIG. 3 (rm file1 file2 file3), by the use of DOW ordering graph construction method described in TABLE 5.

Daemon Write Request—FIG. 11

In this case, suppose that a system daemon requests a write for one of the buffers; specifically, for the buffer that contains the inodes for files file2 and file3. This write call will be intercepted by the dow_strategy function, which first looks for a node corresponding to the requested operation; in this case, it is node C. This situation is depicted in FIG. 11.

Insertion Into Dow_Flush_Chain—FIG. 12

On finding node C, and seeing that there is at least one node preceding it in the graph, the dow_strategy routine searches upward through the graph and marks C and its predecessor A as "pruned". Since A is at the top of the graph, and has no dependence upon any other graph nodes, it is inserted into the dow_flush_chain (see FIG. 12), from which it will be selected by the dow_flush_daemon.

Figure 13:
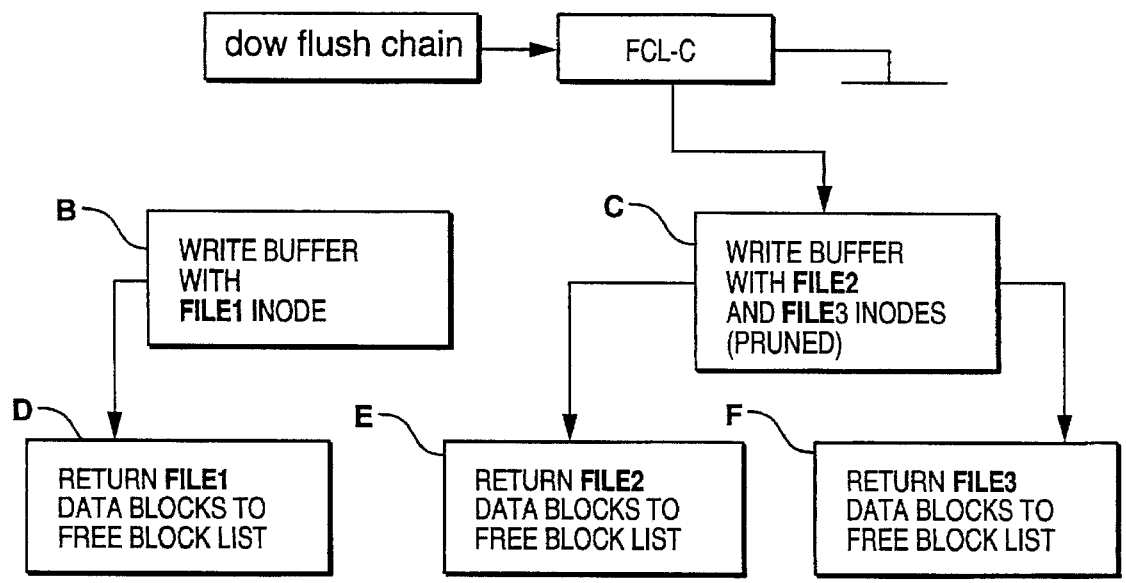
FIG. 13 depicts a block diagram of the processing in which the C node is moved to the dow flush chain after buffer write node completes.

Move To Dow_Flush_Chain—FIG. 13

The dow_flush_daemon executes node A by writing the directory buffer to disk. Upon completion of this write, the link from A to C is dismantled. Since C is marked pruned and has no other predecessors in the graph, it is moved to the dow_flush_chain (FIG. 13).

Figure 14:
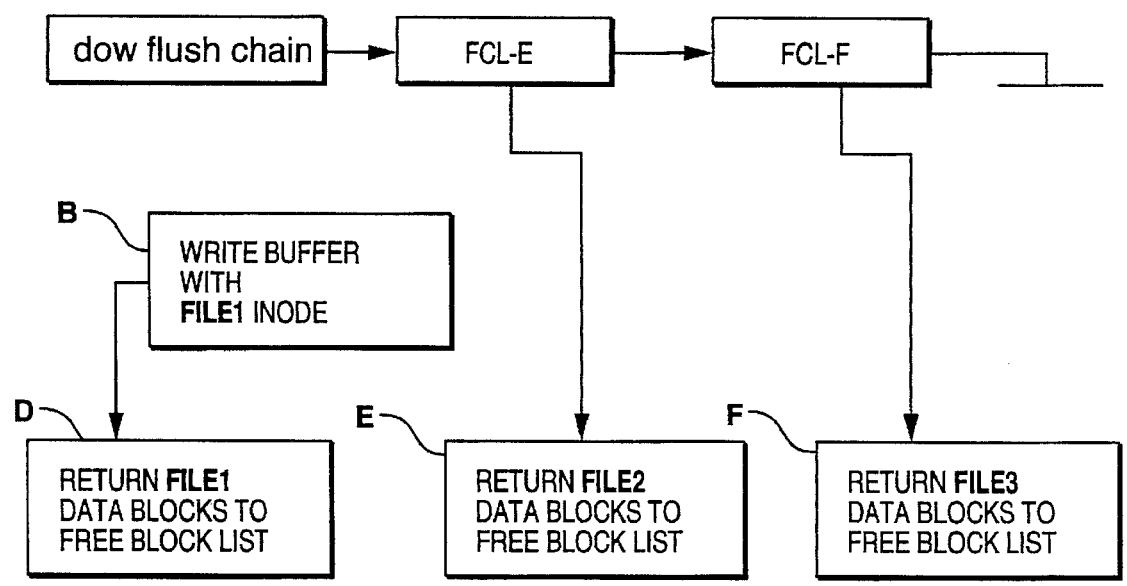
FIG. 14 depicts a block diagram of the processing in which the E and F nodes are moved to the dow flush chain after buffer write completes for the C node.

Move To Dow_Flush_Chain—FIG. 14

Subsequently, the dow_flush_daemon removes node C from the dow_flush_chain, and executes it by writing the buffer to disk. Upon completion of this write, the links between node C and nodes E and F are removed. Since E and F are function nodes, and all nodes preceding them in the ordering graph have been executed, they are moved to the dow_flush_chain (FIG. 14). Thus, after the buffer containing the inodes for files 1 and 2 is written to disk, the functions that return their disk blocks to the free list can be safely invoked; this is done by the dow_flush_daemon as it visits the dow_flush_chain and processes the nodes E and F.

Following this sequence of events, of the original graph nodes, only nodes B and D, remain. At some future time, these nodes will migrate to the dow_flush_chain either because of explicit requests to perform their operations, or perhaps due to expiry of the delay interval permitted on these operations.

Additional Design Considerations

The additional design issues in creating the DOW mechanism divide into

MODULARITY: Implementing the mechanism as a modular subsystem within the kernel.

ERROR RECOVERY: Allowing a file system implementation to recover from an error during a delayed ordered disk write.

DEADLOCK AVOIDANCE: Preventing deadlocks resulting from the addition of ordering dependencies to existing resource dependencies in the kernel.

These design considerations are briefly described in the next three subsections. In these subsections, reference is frequently made to races between agents performing computational operations. This term, "race", is used broadly in the Operating Systems literature to describe the uncontrolled access or modification of an operational variable because of overlapped actions of multiple processes or interrupt handlers, which causes system state to become inconsistent.

Modularity

The DOW mechanism was created as a modular service within the operating system kernel, separate from the other kernel subsystems with which it must coordinate to ensure deadlock free execution. As a modular service, DOW cannot have access to private data within the memory management subsystem or the disk device drivers; DOW cannot, therefore, reliably infer such data as whether a page has been modified or is instantaneously being written to disk. To circumvent this problem, the DOW subsystem independently tracks information about the status of directory pages. This DOW version of information can become stale in rare circumstances. This poses a problem which is described below, along with a solution that has been implemented.

A requirement on the dow_flush_daemon is that it must issue all of its own write requests to the file system implementation, as asynchronous writes. This requirement arises from the consideration that if the dow_flush_daemon were to wait for a write to complete, and the node corresponding to the write operation has predecessors that need to be handled by the dow_flush_daemon during the graph execution procedure described previously, then an impasse develops. The impasse can be removed by directing all page writes to a separate daemon that can write pages synchronously, but at the cost of some loss of performance. With this as the background, staleness of page-modification information tracked independently by the DOW subsystem creates the following problem.

There are two conditions in which a call for asynchronous writing of a page can return without causing a disk operation to occur. These are, (1) the page is already being written to disk by a disk driver (since the asynchronous write cannot wait), or, (2) the file system implementation finds that the page has not been modified since the last time it was written to disk (usually this happens when there is a race with some other instance of write of the same page). From DOW'S standpoint, there is uncertainty, in case (1), about whether the disk write that is in progress (or has just completed) recorded a specific modification, or whether the modification raced with the disk write, and in case (2), about whether the modification state in the DOW data structure is clear at the same time that the modification state in the page is clear. These uncertainties would not arise at all, if DOW subsystem could access the page structures (used by the memory management subsystem) under the cover of the appropriate memory subsystem locks; but such access would compromise the modularity of the DOW and the memory subsystems.

However, the likelihood of races leading to either of the above uncertainties is low. The DOW subsystem takes advantage of the low likelihood of the races, by using this fail-safe algorithm. The dow_flush_daemon attaches a tag to the DOW node identifying itself as the owner of the corresponding page write, and if the write reaches dow_strategy function, then dow_strategy changes the tag so that dow_flush_daemon can discover later that this has happened. In the infrequent cases when the dow_flush_daemon discovers that an attempt to write a page asynchronously failed, it hands the page over to another daemon that is specially created for writing pages synchronously.

Error Recovery

For file system implementations which use delayed ordered writes, many of the write operations are handled asynchronously by the dow_flush_daemon. However, in the event of an I/O error, the file system implementation may wish to regain control of the operation, in order to take some recovery action for the error. DOW makes provision for this, by allowing a file system implementation to register routines to be called in the event of an error. If an error occurs, the DOW subsystem can call the registered routine, passing it information regarding what operation failed and why.

Deadlock Avoidance

One of the effects of deferred execution of disk writes is that new possibilities for process and system deadlocks arise. Listed below are three broad deadlock situations that can arise with the DOW scheme. While these deadlocks can be addressed by certain standard techniques for deadlock avoidance (see, for example, A. C. Shaw, "The Logical Design of Operating Systems," pp. 224–227, Prentice-Hall, 1974), the resulting computational overhead may degrade performance significantly. Hence, for each of the deadlock situations listed below, more details follow, describing the specialized solutions that are simple and efficient and have been used with the DOW implemention.

I/O Inter-dependencies:

I/O inter-dependencies created by DOW could give rise to cycles. Furthermore, file system implementations frequently combine multiple disk reads or disk writes for reducing overhead, in an operation called "clustering". Such I/O clustering could create new, hidden inter-dependencies.

Resource Inter-dependencies:

Performing I/O requires resources. A potential for deadlock exists when DOW subsystem attempts to acquire resources, and these attempts conflict with other resource allocation strategies used by the kernel.

Memory Exhaustion with Blocked Pageout Daemon:

The Pageout daemon is a system process that is used to free up memory. A special memory exhaustion deadlock arises when the pageout daemon is forced to wait for a sequence of delayed ordered writes to complete.

I/O Inter-dependencies

An obvious deadlock condition arises if the ordering graph does not remain acyclic. This condition is prevented by cycle checking in dow_order. To perform exact cycle detection, that is, to identify exactly the situations in which a cycle arises, requires that the DOW subsystem either perform an exhaustive search with every addition of a link to the ordering graph, or, maintain a transitive closure (that is, node-to-node reachability information) over the full ordering graph. Both methods of determining exact connectivity are computationally expensive.

The DOW implementation uses the following simple, but fail-safe heuristic in lieu of performing exact cycle detection. Adding a link A→B to the ordering graph is permitted if either (1) A does not have a predecessor node, or (2) B does not have a dependent node. Otherwise, the DOW subsystem executes one of A or B before permitting the link A→B. While the above heuristic successfully detects true cycles and prevents their occurrence, it has the potential for inferring cycles that do not exist and thereby cause some loss of efficiency from node execution.

However, the heuristic is very successful in avoiding false cycles because of a characteristic of DOW usage. The construction of an ordering graph by a file system implementation usually proceeds linearly, as in the example of TABLE 5, with predecessors nodes created first and dependent nodes added in sequence. The likelihood that two pre-formed chains of dependence links ever fuse is very low; so that as new nodes are added to an existing ordering chain, they go to the end of the chain. In other applications of the DOW mechanism, a more sophisticated heuristic or accurate cycle detection may be more beneficial.

In addition to cycles, I/O interdependence could result from I/O clustering that is frequently performed by file system implementations. Clustering is a performance optimization in which read or write operations on two or more contiguous disk regions are combined before being presented to the disk drivers. With DOW, clustering presents a deadlock potential, since it may create undetectable I/O dependency cycles. A simple example of such a cycle is when two writes are combined as a single I/O but in which one operation has a direct or indirect DOW dependency linkage with respect to the other operation.

Inter-dependence arising from clustering can be avoided by a range of solutions. A general, exhaustive solution would be to cover an entire cluster unit with a special DOW graph node, so that the individual dependence links for each member of a cluster are brought together as dependence links applying to the special DOW graph node for the cluster unit. Another solution is to modify clustering so that the I/O operations are not combined, but issued in quick succession, so that the disk driver can exploit the spatial proximity and sell perform streamlined accesses to disk.

For DOW usage, a simple solution has been implemented. This consists of selectively disabling clustering for those disk blocks that are represented in the ordering graph as subjects of delayed writes. For UFS, this solution applies entirely to directory pages. It is seldom the case that the file system implementation has the opportunity for combining multiple neighboring pages of the same directory in a single disk write, so the loss of clustering for directory page writes has a minimal performance impact.

Resource Inter-dependencies

With DOW, a write operation undertaken by some process may end up having to write out other delayed buffers purely as a side effect. This gives rise to a interdependence, between the original process and other processes, for resources they each hold and which are needed to complete these additional delayed writes. The following example illustrates this problem:

Process pa holds buffer Y locked, and issues a synchronous write for it.

A buffer (or page) Z must precede Y to disk, so an attempt is initiated (which may or may not be in the context of Pa) to acquire the appropriate lock on Z.

Process P2 holds Z and is waiting to acquire Y before it can release Z.

Resource dependence cycles are commonly prevented by using resource hierarchies by which all subsystems perform resource acquisitions. In hierarchy based allocation, each resource category is assigned a hierarchy level, and resource acquisition is permitted only in an increasing (or decreasing) order of hierarchy levels. This ensures that two agents attempting to acquire two resources do not each acquire one of the two resources and then wait indefinitely for the other resource. Thus, a hierarchy allocation rule may have prohibited the allocation of Z to a process that holds Y as a simple means of preventing a resource interdependence from arising.

It is difficult or impossible to apply hierarchy rules to the operation of the dow_flush_daemon. Activities of the dow_flush_daemon cause the dismantling of pre-existing links in the ordering graph, so that new links can be added, and so that dependent nodes are readied for execution. If a hierarchy rule forces the dow_flush_daemon to wait for a resource such as a specific buffer, and the process holding that buffer waits until the dow_flush_daemon can succeed in removing an ordering link in the graph, then an impasse develops between the two processes. One solution is to have the operating system maintain an explicit knowledge of resource ownerships, and force a process to release a specific resource (to break the deadlock), and fall back to a point from which it can re-initiate its operation. Generally this solution degrades performance noticeably.

With DOW usage, a less general but simple and effective solution exists. In this solution a file system implementation that is a DOW client is required to observe this rule:

A process is not allowed to hold a resource (e.g., a page or buffer) which is represented in the ordering graph as the subject of a write operation, while blocking for another resource that is also similarly represented.

This solution is not restrictive because a directory page, or a buffer containing structural information, needs to be held locked by a process in two cases:

An ongoing device driver operation requires the page (or buffer) to be locked. Device driver operations do not take indefinitely long time to complete, and do not need additional pages or buffers locked. Thus only one resource is held at a time.

The process needs to lock out a page (or buffer) for preventing it from being modified by other processes. This happens when a process needs to either read the data contained in the page (or buffer), or modify the data. The file system implementation can ensure that in such cases, only one page (or buffer) is locked at a time, for a read or write access.

There are a small number of instances in the UFS file system implementation that are modified for enforcing the above rule of holding one resource at a time. In all these instances, the file system implementation was previously holding multiple buffers or pages in the course of applying updates. The previous policy of simultaneously holding more than one page or buffer in this way was arbitrary and hence was easily corrected.

Memory Exhaustion with Blocked Pageout Daemon

The pageout daemon handles lists of free but modified pages; it has to write them to disk before they can be available for fresh use. In order to submit a page to a disk driver, the pageout daemon uses a memory unit called "buffer header" to record some auxiliary information about the page, and then passes the address of the buffer header to the disk driver. Normally, the memory needed for this purpose is obtained from a dynamic kernel memory allocator (KMA), to which it is returned as writes complete.

To permit graceful system recovery under extremely severe memory conditions, the kernel maintains a small, "contingency" memory pool for critical uses. If KMA cannot furnish the needed memory to the pageout daemon, then the kernel provides the needed memory from this contingency pool, and as the page writes complete, returns the memory to the contingency pool. When the DOW mechanism is used, the dow_flush_daemon is provided memory from the contingency pool as well, for the asynchronous page writes that it needs to perform, if KMA cannot furnish the needed memory.

As the number of deferred page writes increases, the deferred writes pose a threat to the ability of this contingency pool to cover them in the event of a severe memory exhaustion. If pageout daemon cannot continue to operate in this situation, then a system deadlock can result.

This deadlock is prevented by detecting that the count of deferred page writes due to DOW use has crossed some threshold. When this happens, new dependence creation by the DOW mechanism is disabled temporarily, until the count has been reduced. In the meantime, the system is forced to revert to using synchronous writes instead of creating new ordering dependencies. This operation is done transparently by having dow_order perform the synchronous writes directly on behalf of the file system implementation.

Performance Gain From Delayed Ordered Writes

Comparison of system performance with and without the use of delayed ordered writes in UFS shows that dramatic gains have been achieved by replacing synchronous disk writes with DOW. The measurements were made on a UNIX System V Release 4.2 MP Operating System, running on a single Intel 486/33 Mhz processor with the IDE disk subsystem. The benchmark used for measuring system performance was the System Performance Evaluation Cooperative's Software Development Environment Throughput (SPEC SDET) benchmark (see System Performance Evaluation Cooperative, 057.SDET Benchmark: A user's Guide). The comparison is drawn by normalizing the measurement data to the results obtained without the use of delayed ordered writes.

The SPEC SDET benchmark simulates a multi-user workload in a program development environment and measures throughput as a function of the number of simulated users. In this benchmark, each user is simulated by the execution of a UNIX shell script that is composed of a randomized sequence of commands. A representative script consists of commands to edit files, compile and link programs, create, remove, and copy directories and files, and text formatting and spell-checking documents. While each script executes a different sequence of these commands, all scripts are composed of the same aggregate command mix, so that the total work done by each of the simulated users is identical. In the absence of DOW usage, the performance of the benchmarked system is found to be limited by the speed with which read/write I/O is performed to disk.

Figure 15:
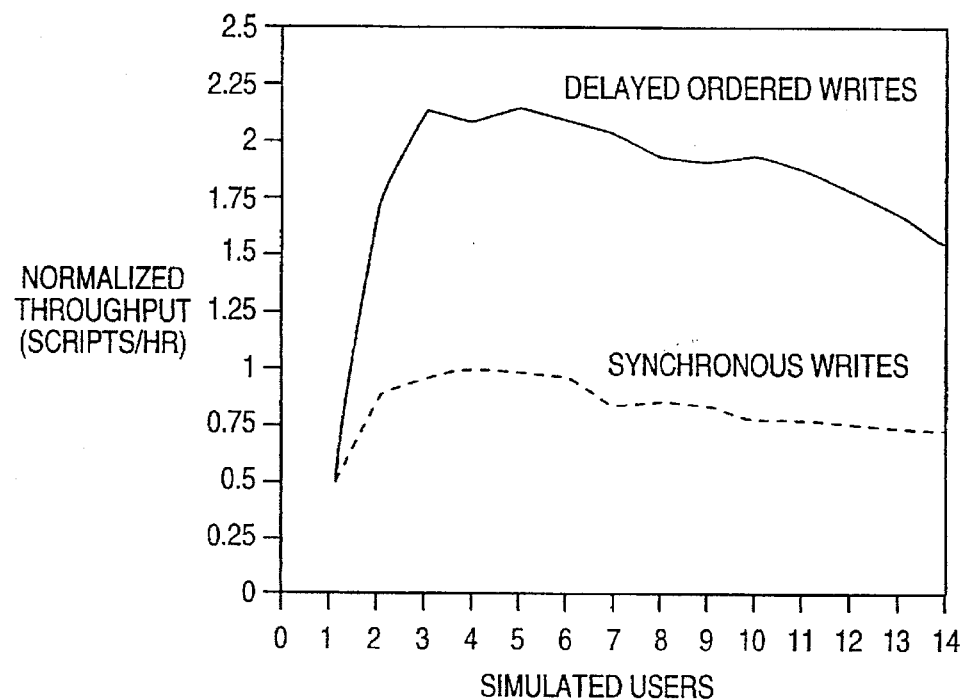
FIG. 15 depicts normalized system throughput for users with and without delayed ordered writes.

Normalized System Throughput—FIG. 15

FIG. 15 compares the normalized system throughput with and without DOW usage. DOW usage improves the SPEC SDET measure of system's peak performance by more than a factor of two. This happens as the benchmarked system moves from being disk bound in the base case to becoming bound by the processor execution speed with DOW usage.

Figure 16:
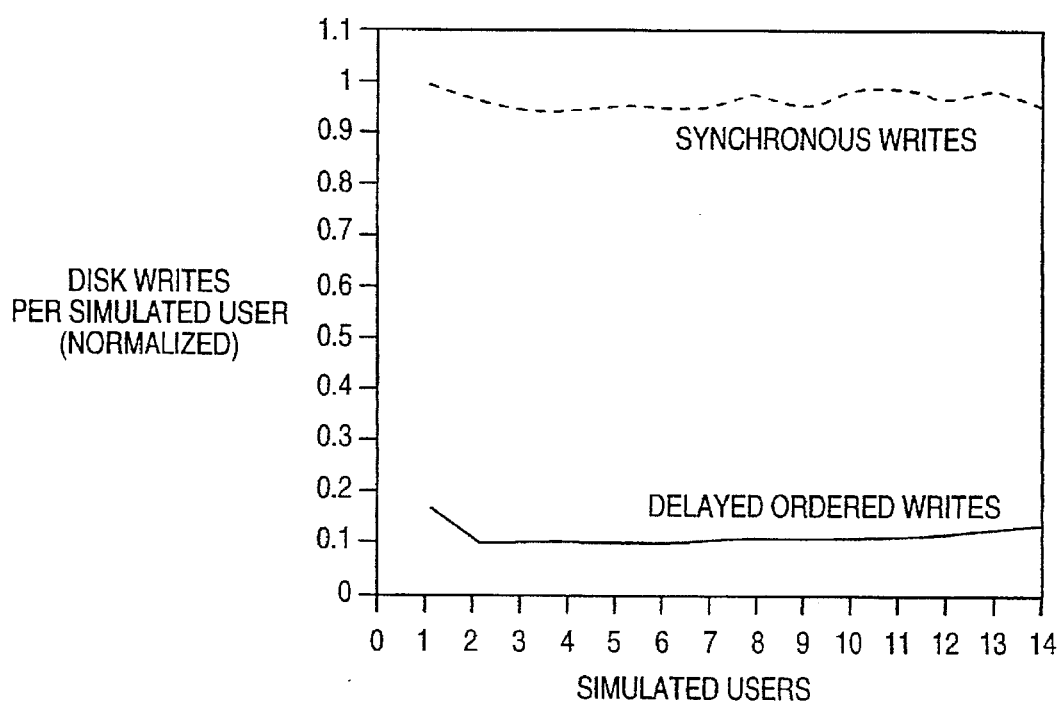
FIG. 16 depicts disk writes per user with and without delayed ordered writes.

Disk Write Operations Reduction—FIGS. 16 and 17

The reduction in disk write operations is confirmed by FIG. 16 which shows that the number of disk write operations reduces by 85% the number without the use of DOW. An added benefit from the reduction of synchronous writes is a 50% drop in the aggregate number of process context switches, as shown in FIG. 17.

Decrease In Disk Service Time—FIG. 18

An additional indirect benefit of using delayed ordered writes is a decrease in the average disk service time, as shown in FIG. 18. The decrease in disk service time occurs because the dow_flush_daemon can issue multiple concurrent disk requests (since its disk operations are not synchronous), and thus enable the disk driver to better schedule these disk writes for best disk access performance.

Figure 19:
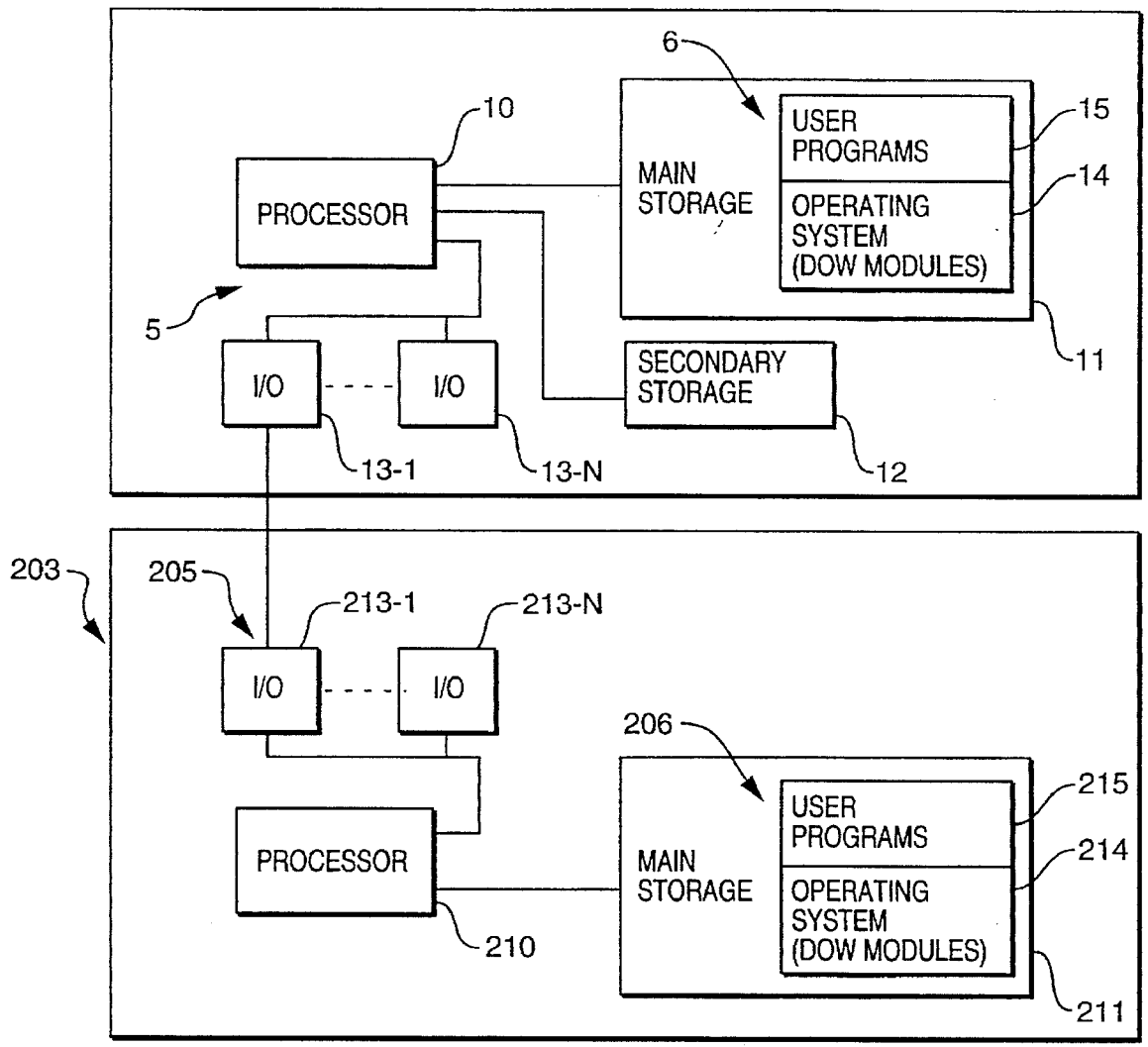
FIG. 19 depicts a block diagram of a computer system employing ordered operations in a network environment.

Network File System Environment—FIG. 19

The computer system 3 of FIG. 19 is a server system that connects to a client system in the form of computer system 3'. The computer system 3 of FIG. 19 like in FIG. 1 is composed of hardware 5 and software 6. The hardware 5 includes one or more processors 10, typically a central processing unit (CPU), main storage 11, input/output (I/O) in the form of secondary storage 12 and other input/output devices 13-1, . . . 13-N. The software 6 includes an operating system 14 and user (application) programs 15. The computer system 3 executes user programs 15 in the hardware 5 under control of the operating system 14. A common instance of the operating system 14 is the UNIX® operating system.

The client computer system 3' of FIG. 19 is composed of hardware 5' and software 6'. The hardware 5' includes one or more processors 10', typically a central processing unit (CPU), main storage 11', input/output (I/O) in the form of input/output devices 13'-1, . . . 13'-N. The software 6' includes an operating system 14' and user (application) programs 15'. The computer system 3' executes user programs 15' in the hardware 5' under control of the operating system 14'. A common instance of the operating system 14' is the UNIX® operating system.

The I/O devices 13-1 and 13'-1 in the server system 3 and the client system 3', respectively, connect the systems 3 and 3' together through a network 50 to form a Network File System (NFS). The network 50 is any Conventional local-area network.

An example of the use of delayed ordered writes in place of synchronous writes to improve response time and throughput in the Network File System is described.

The Network File System (NFS) permits sharing of files between different computer systems connected via a network. NFS allows processes located on one computer system, such as NFS client system 3', to access files on a (usually) different computer system, such as server system 3. On an NFS server system 3, several processes called server processes execute in order to provide the necessary file access services to client system 3'.

When a process running on the client system 3' wishes to access a file on the server system 3, it sends a request through the network to the server system 3. The request is handled by one of the server processes, which performs the operation specified by the request, and then sends a response back across the network to the client. The response may include data or status information.

Before it sends a response back to the client, the server process must ensure that all data modifications associated with the request have been written to disk. For example, on a file write request, the server process must write the file data to disk along with any structural modifications such as the inode and indirect blocks, wait for those writes to complete, and then send the response back to the client.

Server processes typically use synchronous writes to meet this requirement. For example, to service a write request, a server process uses synchronous writes to write data, inode, and, if necessary, indirect block modifications to disk. Since the server process waits for each synchronous write to to complete before proceeding, this use of synchronous writes guarantees that the data will be on disk before the response message is sent.

Typically, a server process takes these steps, in time order, to service a client request for writing a file:
1. Acquire lock protecting file data structures.
2. A. Modify in-memory copy of indirect block, if necessary. B. Synchronously write buffer containing indirect block to disk, if modified.
3. A. Modify in-memory copy of file data. B. Synchronously write buffer containing file data to disk.
4. A. Modify in-memory copy of inode. B. Synchronously write buffer containing inode to disk.
5. Release lock protecting file data structures.
6. Send response message back to user.

One major drawback of this scheme is that if multiple requests arrive for the same file, the server processes handling these requests will each need to acquire the same lock (in step 1, above). One process at a time would acquire the lock, perform steps 2, 3, and 4, and then release the lock for another process to acquire. The time for which the lock is held includes the duration of time that each of the synchronous disk writes in steps 2B, 3B, and 4B take. Thus, each server process will hold the lock for a long duration before allowing another server process to perform work for the same file, and thereby reduce the ability of the NFS server to provide fast response and high throughput to its clients.

A second drawback in the above scheme is that the disk is likely to be under utilized. Because the synchronous writes are serialized, each is sent to the disk driver one at a time. The disk driver is thus forced to schedule the writes in the order in which they are requested, even if an alternate order would be more efficient. Also, little or no overlap of work happens between the disk driver and the server processes, since the disk driver stays idle during the interval between the completion of one write and the initiation of the next, and since the server process needs to wait for each of the disk writes to complete.

An alternative scheme would be to use delayed ordered writes in place of synchronous writes. In this scheme, the server process could instead issue delayed ordered writes, and specify an ordering relationship between each write and a deferred function call which would signal the server process when all the writes have completed. Instead of holding the lock across all of its operations, a server process would need to hold the lock only during the modifications of in-memory copies of the information that is modified; and the time spent waiting by a server process for disk write completions would not inflate the lock hold time. Specifically, in the DOW-based scheme, server process would take the following steps to service a write request:
1. Acquire lock protecting file data structures.
2. Create DOW node for function call to signal the server process.
3. A. Modify in-memory copy of indirect block, if necessary. B. If the in-memory copy of the indirect block has been modified, establish an ordering specifying that the function which signals the server process is to be called after writing the buffer containing the indirect block. C. If the indirect block has been modified, issue delayed or asynchronous write to disk of buffer containing indirect block.
4. A. Modify in-memory copy of file data. B. Establish an ordering specifying that the function which signals the server process is to be called after writing the buffer containing the in-memory copy of the file data. C. Issue a delayed or asynchronous write to disk of the buffer containing the file data.
5. A. Modify in-memory copy of inode. B. Establish an ordering specifying that the function which signals the server process is to be called after writing the buffer containing the in-memory copy of the inode. C. Issue a delayed or asynchronous write to disk of the buffer containing the inode.
6. Release lock protecting file data structures.
7. Wait for signal (coming from function) that the disk writes have completed.
8. Send response message back to user.

This scheme addresses the two drawbacks of the previous scheme. First, the file lock is only held during the time that the in-memory file state is modified, and the DOW graph is being constructed; it is released before the disk writes complete. This means the lock is held for much less time on each write, and lock contention is reduced. The reduced lock contention in turn means that each server process acquires the lock sooner, and is able to begin servicing its request more quickly.

Secondly, in this scheme, each write request is handed to the disk driver before the previous one completes. This allows the disk driver to schedule the disk jobs more efficiently, and tends to keep the disk queue full, which also makes more efficient use of the disk.

Figure 20:
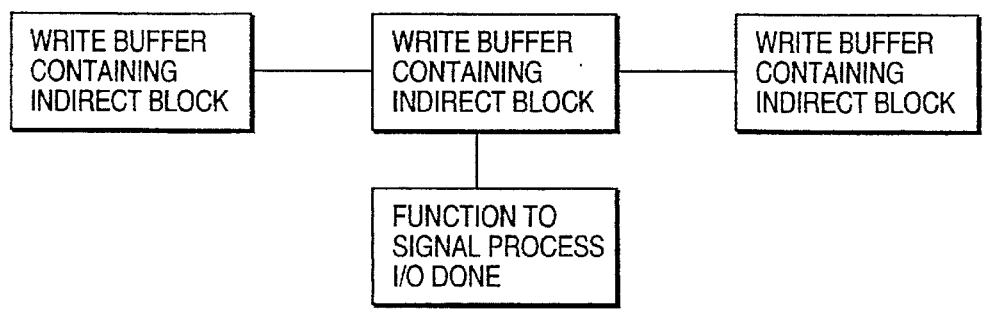
FIG. 20 depicts a block diagram of the processing for the computer system of FIG. 20.

Network File System Directed Acyclic Graph—FIG. 20

FIG. 20 depicts the directed acyclic graph for the network file system of FIG. 19.

Conclusion

The present invention provides a facility called Delayed Ordered Writes (DOW), which is used by a file system implementation to schedule the writing of a set of data items from primary to secondary storage so that the writing of these items occurs in a specific, desired order. Use of this facility makes it unnecessary to employ synchronous disk writing for guaranteed ordering among disk writes.

The performance benefits of using this facility are significant. Disk writes are reduced by nearly an order of magnitude for typical UNIX operating system workloads because of the much improved disk write caching that is possible with delayed writing. In addition, context switching is reduced is well, which improves the productive utilization of the processor.

The DOW usage and performance gains were measured in the context of the UFS file system implementation in a recent version of the UNIX Operating System (System V, Release 4.2 Multi-processor UNIX Operating System). DOW can be used equally beneficially with other file system implementations, such as the AT&T UNIX System V (S5)

file system. It may also be used, for example, to extend the benefits already achieved in some file system implementations from the use of techniques such as disk logging.

The DOW facility is available as a modular service, which will facilitate its integration into other UNIX Operating system implementations. While it is available as a mechanism for enforcing ordering among the writing operations, the policy for determining the necessary ordering is maintained with the clients of the DOW facility. Furthermore, a DOW client retains the ability of enabling or disabling the DOW optimization at run time, and to apply the optimization selectively among the write operations that it needs to perform. With DOW use, a file system implementation obtains dramatic improvement of performance without losing file system media compatibility and with minimal modification of code structure.

Use of delayed ordered writes in some applications can increase parallelism, thereby improving performance without necessarily reducing the number of disk writes.

While the invention has been particularly shown and described with reference to preferred embodiments thereof it will be understood by those skilled in the art that various changes in form and details may be made therein without departing from the spirit and scope of the invention.

We claim:

1. An ordering subsystem for controlling the order of operations in a computer system, the computer system having a first unit and a second unit for files, having a file management subsystem for controlling operations for files, said file management subsystem specifying operations for files in response to new requests where a sequence of requests for said operations is represented by the requests $R1, R2, \ldots, Rr$ and where the requests for said operations in said sequence have order dependencies $D1, D2, \ldots, Dd$ where r and d are integers, said order dependencies constraining the order for carrying out said operations, said ordering subsystem including, an ordering store for storing a plurality of entries, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add means for adding entries to the ordering store by processing said new requests to identify one or more common operations $CO0, CO1, \ldots, COco$, each of said common operations identifying an operation requested by one or more of the requests $R1, R2, \ldots, Rr$, where said common operations have common order dependencies $CD0, CD1, \ldots, CDcd$ that preserve the order dependencies $D1, D2, \ldots, Dd$ between the operations in the requests, and where co and cd are integers, execution means for executing said one or more common operations $CO0, CO1, \ldots, COco$ responsive to the entries in the ordering store, and delete means for deleting entries from the ordering store.

2. The ordering subsystem of claim 1 wherein said add means includes, dow_create means for providing one or more of said entries as operation entries for identifying common operations, and dow_order means for providing one or more of said entries as order entries for identifying said common order dependencies.

3. The ordering subsystem of claim 2 wherein said delete means includes operation delete means for deleting operation entries from said ordering store and includes order delete means for deleting order entries from said ordering store.

4. The ordering subsystem of claim 3 wherein said delete means includes dow_abort means for deleting entries from said ordering store.

5. The ordering subsystem of claim 4 wherein said dow_abort means operates asynchronously with respect to said execution means.

6. The ordering subsystem of claim 1 wherein said operations include writes from said first unit to said second unit.

7. The ordering subsystem of claim 1 wherein said operations include function calls.

8. The ordering subsystem of claim 1 wherein said first unit is primary storage and said second unit is secondary storage and wherein said requests are update requests and said operations include writes from said primary storage to said secondary storage.

9. The ordering subsystem of claim 1 wherein said first unit is primary storage and said second unit is secondary storage and wherein said requests are update requests and said operations include writes from said primary storage to said secondary storage and may include function calls.

10. The ordering subsystem of claim 9 wherein a write for one or more of said update requests is delayed so as to be part of one of said common writes.

11. The ordering subsystem of claim 9 wherein said update requests $R1, R2, \ldots, Rr$ are presented in time order with R1 before R2, R2 before R3, ..., R(r−1) before Rr and wherein a write for one or more of said update requests is delayed so as to be part of one of said common writes whereby writes for one or more of said update request are not necessarily in the time order of the update requests $R1, R2, \ldots, Rr$.

12. The ordering subsystem of claim 9 wherein said add means operates asynchronously with respect to said execution means.

13. The ordering subsystem of claim 9 wherein said delete means operates asynchronously with respect to said execution means.

14. The ordering subsystem of claim 1 wherein said system includes a local unit and a remote unit connected by a network.

15. The ordering subsystem of claim 14 wherein said first unit is primary storage in said local unit and said second unit is secondary storage in said local unit, wherein said requests are update requests and said operations include writes from said primary storage to said secondary storage and may include function calls, and wherein said remote unit initiates said requests for writes from said primary storage to said secondary storage over said network.

16. An ordered write subsystem for controlling the order of operations in connection with writes from primary storage to secondary storage in a computer system, the computer system having data organized in files, having primary storage for storing files, having a secondary storage for storing files, having a file management subsystem for controlling transfers of files between primary storage and secondary storage, said file management subsystem specifying operations in connection with writes from primary storage to secondary storage in response to new update requests for said operations, where a sequence of update requests is represented by the update requests $R1, R2, \ldots, R(r−1), Rr$, where the update requests in said sequence have order dependencies D1, D2, ..., Dd and where r and d are integers, said order dependencies constraining the order for carrying out said operations, said ordered write subsystem including, an ordering store for storing a plurality of entries, each of said entries containing an operation type identifying one of said operations, at least one of said entries at some time also containing a link which links said entry to another of said entries, said link specifying an order for carrying out said operations in said linked entries, said entries and said links defining a partially ordered acyclic graph, add means for adding entries to said ordering store by processing said new update requests to identify common operations, said common operations including, one or more common writes CW1, CW2, ..., CWcw for a combined operation requested by one or more of the update requests R1, R2, ..., Rr where cw is an integer less than r, and one or more function calls FC1, FC2, ..., FCfc where fc is an integer, and wherein said common writes and said function calls have common order dependencies CD1, CD2, ..., CDcd that preserve the update order dependencies D1, D2, ..., Dd between the operations, where cd is an integer, execution means for executing common operations including, write means responsive to the entries in the ordering store for writing from primary storage to secondary storage with said common writes CW1, CW2, ..., CWcw constrained by the common-write order dependencies CD1, CD2, ..., CDcd, function means for executing said function calls, and delete means for deleting entries from the ordering store.

17. The ordering subsystem of claim 16 wherein said add means includes, dow_create means for providing one or more of said entries as operation entries for identifying said common operations, and dow_order means for providing one or more of said entries as order entries for identifying said common order dependencies.

18. The ordering subsystem of claim 17 wherein said dow_create means provides said operation as common-write entries for identifying common writes.

19. The ordering subsystem of claim 17 wherein said dow_create means provides said operation entries as function-call entries for identifying function calls.

20. The ordering subsystem of claim 16 wherein said ordering store includes ordered locations with higher-order locations and lower-order locations and for each common-write entry, zero or more higher-order locations for an order entry pointing to zero or more high-order common writes and zero or more lower-order locations for an order entry pointing to zero or more lower-order common writes.

21. The ordering subsystem of claim 16 wherein a write for one or more of said update requests is delayed so as to be part of one of said common writes.

22. The ordering subsystem of claim 16 wherein said update requests R1, R2, ..., Rr are presented in time order with R1 and before R2, R2 before R3, ..., R(r-1) before Rr and wherein a write for one or more of said update requests is delayed so as to be part of one of said common writes whereby writes for one or more of said update requests are not in the time order of the update requests R1, R2, ..., R(r-1), Rr.

23. The ordering subsystem of claim 16 wherein said add means operates asynchronously with respect to said execution means.

24. The ordering subsystem of claim 16 wherein said delete means includes operation delete means for deleting operation entries from said ordering store and includes order delete means for deleting order entries from said ordering store.

25. The ordering subsystem of claim 24 wherein said operation delete means includes dow_abort means for deleting entries from said ordering store.

26. The ordering subsystem of claim 25 wherein said dow_abort means operates asynchronously with respect to said execution means.

27. The ordering subsystem of claim 16 wherein said primary storage includes a cache and wherein said ordered write subsystem causes said file management subsystem to initiate writes from said cache.

28. The ordering subsystem of claim 26 further including device drivers connected to write from said cache to said secondary storage.

29. A method in a computer system having a first unit and second unit for files, having a file management subsystem for controlling operations for files, said file management subsystem specifying operations for files in response to new requests where a sequence of requests for the operations is represented by the requests R1, R2, ..., Rr and where the requests for the operations in said sequence have order dependencies D1, D2, ..., Dd where r and d are integers, said order dependencies constraining the order for carrying out the operations, said computer system including an ordering subsystem for controlling the order of operations including, said method comprising:

storing a plurality of entries in an ordering store, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, adding entries to the ordering store by processing said new requests to identify one or more common operations CO1, CO2, ..., COco, each of the common operations identifying an operation requested by one or more of the requests R1, R2, ..., Rr, where said common operations have common order dependencies CD1, CD2, ..., CDcd that preserve the order dependencies D1, D2, ..., Dd between the operations in the requests, and where co and cd are integers, and executing said one or more common operations CO1, CO2, ..., COco responsive to the entries in the ordering store.

30. The computer method of claim 29 wherein said adding step includes, dow_create step for providing one or more of said entries as operation entries for identifying common operations, and dow_order step for providing one or more of said entries as order entries for identifying said common order dependencies.

31. The computer method of claim 30 further comprising a delete step which includes an operation delete step for deleting operation entries from said ordering store and includes an order delete step for deleting order entries from said ordering store.

32. The computer method of claim 31 wherein said delete step includes a dow_abort step for deleting entries from said ordering store.

33. The computer method of claim 32 wherein said dow_abort step operates asynchronously with respect to said execution step.

34. The computer method of claim 29 wherein said operations include writes from said first unit to said second unit.

35. The computer method of claim 29 wherein said operations include function calls.

36. The computer method of claim 29 wherein said first unit is primary storage and said second unit is secondary storage and wherein said requests are update requests and said operations include writes from said primary storage to said secondary storage.

37. The computer method of claim 29 wherein said first unit is primary storage and said second unit is secondary storage and wherein said requests are update requests and said operations include writes from said primary storage to said secondary storage and may include function calls.

38. The computer method of claim 37 wherein a write for one or more of said update requests is delayed so as to be part of one of said common writes.

39. The computer method of claim 37 wherein said update requests R1, R2, ..., Rr are presented in time order with R1 before R2, R2 before R3, ..., R(r−1) before Rr and wherein a write for one or more of said update requests is delayed so as to be part of one of said common writes whereby writes for one or more of said update requests are not necessarily in the time order of the update requests R1, R2, ..., Rr.

40. The computer method of claim 37 wherein said add step operates asynchronously with respect to said execution step.

41. The computer method of claim 37 further comprising a delete step which operates asynchronously with respect to said execution step.

42. The computer method of claim 29 wherein said system includes a local unit and a remote unit connected by a network.

43. The computer method of claim 42 wherein said first unit is primary storage in said local unit and said second unit is secondary storage in said local unit, wherein said requests are update requests and said operations include writes from said primary storage to said secondary storage and may include function calls, wherein said remote unit communicates over said network with said local unit to move data between said first unit and said second unit.

44. A computer method in a computer system having data organized in files, having primary storage for storing files, having a secondary storage for storing files, having a file management subsystem for controlling transfers of files between primary storage and secondary storage, said file management subsystem specifying operations in connection with writes from primary storage to secondary storage in response to new update requests where a sequence of update requests for the operations is represented by the update requests R1, R2, ..., R(r−1), Rr, where the update requests in said sequence have order dependencies. D1, D2, ..., Dd and where r and d are integers, the order dependencies constraining the order for carrying out the operations, said computer method including an ordered write subsystem for controlling the order of operations in connection with writes from primary storage to secondary storage, said method including, storing a plurality of entries in an ordering store, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add steps for adding entries to said ordering store by processing said new update requests to identify common operations, said common operations including, one or more common writes CW1, CW2, ..., CWcw for a combined operation identifying an operation requested by one or more of the update requests R1, R2, ..., Rr where cw is an integer less than r, and one or more function calls FC1, FC2, ..., FCfc where fc is an integer, and where said common writes and said function calls have common order dependencies CD1, CD2, ..., CDcd that preserve the update order dependencies D1, D2, ..., Dd between the operations in the requests, where cd is an integer, executing common operations including, write steps responsive to the entries in the ordering store for writing from primary storage to secondary storage with said common writes CW1, CW2, ..., CWcw constrained by the common-write order dependencies CD1, CD2, ..., CDcd, function steps for executing said function calls, and deleting entries from the ordering store.

45. The computer method of claim 44 wherein said add steps include, dow_create steps for providing one or more of said entries as operation entries for identifying said common operations, and dow_order steps for providing one or more of said entries as order entries for identifying said common order dependencies.

46. The computer method of claim 44 wherein said dow_create steps provide said operation entries as common-write entries for identifying common writes.

47. The computer method of claim 44 wherein said dow_create steps provide said operation entries as function-call entries for identifying function calls.

48. The computer method of claim 44 wherein said ordering store includes ordered locations with higher-order locations and lower-order locations and wherein said ordering store includes for each common-write entry, zero or more higher-order locations for an order entry pointing to zero or more higher-order common writes and zero or more lower-order locations for an order entry pointing to zero or more lower-order common writes.

49. The computer method of claim 44 wherein a write for one or more of said update requests is delayed so as to be part of one of said common writes.

50. The computer method of claim 44 wherein said update requests R1, R2, ..., Rr are presented in time order with R1, R2 before R3, ..., R(r−1) before Rr and wherein a write for one or more of said update requests is delayed so as to be part of one of said common writes whereby writes for one or more of said update requests are not in the time order of the update requests R1, R2, ..., R(r−1), Rr.

51. The computer method of claim 44 wherein said add steps operate asynchronously with respect to said execution steps.

52. The computer method of claim 44 wherein said deleting step includes an operation delete step for deleting operation entries from said ordering store and includes an order delete step for deleting order entries from said ordering store.

* * * * *